US012347939B2

(12) United States Patent
Leung et al.

(10) Patent No.: US 12,347,939 B2
(45) Date of Patent: Jul. 1, 2025

(54) PHASED ARRAY ANTENNA AND ANTENNA FOR PHASED ARRAY ANTENNA

(71) Applicant: City University of Hong Kong, Kowloon (HK)

(72) Inventors: Kwok Wa Leung, Kowloon (HK); Zhili Su, Kowloon (HK); Kai Lu, Guangdong (CN)

(73) Assignee: City University of Hong Kong, Kowloon (HK)

( * ) Notice: Subject to any disclaimer, the term of this patent is extended or adjusted under 35 U.S.C. 154(b) by 483 days.

(21) Appl. No.: 17/885,754

(22) Filed: Aug. 11, 2022

(65) Prior Publication Data

US 2024/0055760 A1 Feb. 15, 2024

(51) Int. Cl.

*H01Q 21/00* (2006.01)
*H01Q 3/36* (2006.01)
*H01Q 9/04* (2006.01)

(52) U.S. Cl.

CPC ............. *H01Q 3/36* (2013.01); *H01Q 9/0485* (2013.01)

(58) Field of Classification Search

CPC .. H01Q 3/36; H01Q 3/01; H01Q 3/26; H01Q 9/0485; H01Q 21/067; H01Q 21/00; H01Q 21/0087; H01Q 1/36; H01Q 4/0492

See application file for complete search history.

(56) References Cited

U.S. PATENT DOCUMENTS

| | | | | |
|---|---|---|---|---|
| 5,453,754 | A * | 9/1995 | Fray | H01Q 19/09 343/873 |
| 6,147,647 | A * | 11/2000 | Tassoudji | H01Q 21/28 333/219.1 |
| 6,452,565 | B1 * | 9/2002 | Kingsley | H01Q 9/0492 343/873 |
| 11,239,553 | B2 | 2/2022 | Mahanfar | |
| 11,264,733 | B2 | 3/2022 | Lahav et al. | |
| 2019/0379123 | A1 * | 12/2019 | Leung | H01Q 1/22 |
| 2020/0028231 | A1 * | 1/2020 | Leung | H01Q 1/38 |
| 2021/0384648 | A1 * | 12/2021 | Leung | H01Q 9/0485 |
| 2022/0336957 | A1 * | 10/2022 | Lee | H01Q 9/0485 |

FOREIGN PATENT DOCUMENTS

| | | |
|---|---|---|
| CN | 108011196 | 5/2018 |
| CN | 113690636 | 11/2021 |
| EP | 3819984 | 5/2021 |

OTHER PUBLICATIONS

R. C. Hansen, Phased Array Antennas, 2nd ed. Hoboken, NJ, USA: Wiley, 2009.

R. Xia, S. Qu, P. Li, D. Yang, S. Yang, and Z. Nie, "Wide-angle scanning phased array using an efficient decoupling network," IEEE Trans. Antennas Propag., vol. 63, No. 11, pp. 5161-5165, Nov. 2015.

(Continued)

*Primary Examiner* — Awat M Salih

(74) *Attorney, Agent, or Firm* — Renner, Kenner, Greive, Bobak, Taylor & Weber

(57) ABSTRACT

An antenna for a phased array antenna. The antenna includes a substrate, a radiation element arranged on the substrate, and a radiation pattern shaping mechanism operable to reduce central radiation provided by the radiation element during operation.

27 Claims, 22 Drawing Sheets

(56) References Cited

OTHER PUBLICATIONS

K.-L. Wu, C. Wei, X. Mei, and Z.-Y. Zhang, "Array-antenna decoupling surface," IEEE Trans. Antennas Propag., vol. 65, No. 12, pp. 6728-6738, Dec. 2017.
B. A. Arand, A. Bazrkar, and A. Zahedi, "Design of a phased array in triangular grid with an efficient matching network and reduced mutual coupling for wide-angle scanning," IEEE Trans. Antennas Propag., vol. 65, No. 6, pp. 2983-2991, Jun. 2017.
J.-Y. Lee, J. Choi, D. Choi, Y. Youn, and W. Hong, "Broadband and wide-angle scanning capability in low-coupled mm-wave phased-arrays incorporating ILA with HIS fabricated on FR-4 PCB," IEEE Trans. Veh. Technol., vol. 70, No. 3, pp. 2076-2088, Mar. 2021.
W.-M. Zou, S.-W. Qu, and S. Yang, "Wideband wide-scanning phased array in triangular lattice with electromagnetic bandgap structures," IEEE Antennas Wirel. Propag. Lett., vol. 18, No. 3, pp. 422-426, Mar. 2019.
L. Gu, Y.-W. Zhao, Q.-M. Cai, Z.-P. Zhang, B.-H. Xu, and Z.-P. Nie, "Scanning enhanced low-profile broadband phased array with radiator-sharing approach and defected ground structures," IEEE Trans. Antennas Propag., vol. 65, No. 11, pp. 5846-5854, Nov. 2017.
Y.-F. Cheng, X. Ding, W. Shao, and B.-Z. Wang, "Planar wide-angle scanning phased array with pattern-reconfigurable windmill-shaped loop elements," IEEE Trans. Antennas Propag., vol. 65, No. 2, pp. 932-936, Feb. 2017.
X. Ding, Y.-F. Cheng, W. Shao, and B.-Z. Wang, "A wide-angle scanning phased array with microstrip patch mode reconfiguration technique," IEEE Trans. Antennas Propag., vol. 65, No. 9, pp. 4548-4555, Sep. 2017.
X. Ding, Y. Cheng, W. Shao, H. Li, B. Wang, and D. E. Anagnostou, "A wide-angle scanning planar phased array with pattern reconfigurable magnetic current element," IEEE Trans. Antennas Propag., vol. 65, No. 3, pp. 1434-1439, Mar. 2017.
G.-F. Gao, X. Ding, Y.-F. Cheng, and W. Shao, "Dual-polarized wide-angle scanning phased array based on mutimode patch elements," IEEE Antennas Wirel. Propag. Lett., vol. 18, No. 3, pp. 546-550, Mar. 2019.
Z. Chen, Z. Song, H. Liu, X. Liu, J. Yu, and X. Chen, "A compact phase-controlled pattern-reconfigurable dielectric resonator antenna for passive wide-angle beam scanning," IEEE Trans. Antennas Propag., vol. 69, No. 5, pp. 2981-2986, May 2021.
G. Yang, J. Li, S. G. Zhou, and Y. Qi, "A wide-angle E-plane scanning linear array antenna with wide beam elements," IEEE Antennas Wirel. Propag. Lett., vol. 16, pp. 2923-2926, 2017.
G. Yang, J. Li, D. Wei, and R. Xu, "Study on wide-angle scanning linear phased array antenna," IEEE Trans. Antennas Propag., vol. 66, No. 1, pp. 450-455, Jan. 2018.
Y.-Q. Wen, S. Gao, B.-Z. Wang, and Q. Luo, "Dual-polarized and wide-angle scanning microstrip phased array," IEEE Trans. Antennas Propag., vol. 66, No. 7, pp. 3775-3780, Jul. 2018.
B.-F. Sun, X. Ding, Y.-F. Cheng, and W. Shao, "2-D wide-angle scanning phased array with hybrid patch mode technique," IEEE Antennas Wirel. Propag. Lett., vol. 19, No. 4, pp. 700-704, Apr. 2020.
H. Yang, X. Cao, J. Gao, H. Yang, and T. Li, "A wide-beam antenna for wide-angle scanning linear phased arrays," EEE Antennas Wirel. Propag. Lett., vol. 19, No. 12, pp. 2122-2126, Dec. 2020.
G.-W. Yang and S. Zhang, "A dual-band shared-aperture antenna with wide-angle scanning capability for mobile system applications," IEEE Trans. Veh. Technol., vol. 70, No. 5, pp. 4088-4097, May 2021.
Y. Wen, B. Wang, and X. Ding, "Wide-beam SIW-slot antenna for wide-angle scanning phased array," IEEE Antennas Wirel. Propag. Lett., vol. 15, pp. 1638-1641, 2016.
C.-M. Liu, S.-Q. Xiao, H.-L. Tu, and Z. Ding, "Wide-angle scanning low profile phased array antenna based on a novel magnetic dipole," IEEE Trans. Antennas Propag., vol. 65, No. 3, pp. 1151-1162, Mar. 2017.
C.-M. Liu, S. Xiao, and X.-L. Zhang, "A compact, low-profile wire antenna applied to wide-angle scanning phased array," IEEE Antennas Wirel. Propag. Lett., vol. 17, No. 3, pp. 389-392, Mar. 2018.
Y.-Q. Wen, B.-Z. Wang, and X. Ding, "A wide-angle scanning and low sidelobe level microstrip phased array based on genetic algorithm optimization," IEEE Trans. Antennas Propag., vol. 64, No. 2, pp. 805-810, Feb. 2016.
R. Wang, B. Wang, X. Ding, and X. Yang, "Planar phased array with wide-angle scanning performance based on image theory," IEEE Trans. Antennas Propag., vol. 63, No. 9, pp. 3908-3917, Sep. 2015.
Y.-F. Cheng, X. Ding, W. Shao, M.-X. Yu, and B.-Z. Wang, "2-D planar wide-angle scanning-phased array based on wide-beam elements," IEEE Antennas Wirel. Propag. Lett., vol. 16, pp. 876-879, 2017.
F.-L. Jin, X. Ding, Y.-F. Cheng, B.-Z. Wang, and W. Shao, "Impedance matching design of a low-profile wide-angle scanning phased array," IEEE Trans. Antennas Propag., vol. 67, No. 10, pp. 6401-6409, Oct. 2019.
W. L. Stutzman and G. A. Thiele, Antenna theory and design, 3rd ed. Hoboken, NJ, USA: Wiley, 2013.
C. A. Balanis, Antenna theory: analysis and design, 3rd ed. Hoboken, NJ, USA: Wiley, 2005.
D. M. Pozar, "The active element pattern," IEEE Trans. Antennas Propag., vol. 42, No. 8, pp. 1176-1178, Aug. 1994.
S. Sun, Y. Jiao, and Z. Weng, "Wide-beam dielectric resonator antenna with attached higher-permittivity dielectric slabs," IEEE Antennas Wirel. Propag. Lett., vol. 19, No. 3, pp. 462-466, Mar. 2020.
R.-Y. Li, Y.-C. Jiao, Y.-X. Zhang, L. Zhang, and H.-Y. Wang, "A DRA with engraved groove and comb-like metal wall for beamwidth enhancement in both E- and H-planes," IEEE Antennas Wirel. Propag. Lett., vol. 20, No. 4, pp. 543-547, Apr. 2021.
G. Yang, J. Li, J. Yang, and S. Zhou, "A wide beamwidth and wideband magnetoelectric dipole antenna," IEEE Trans. Antennas Propag., vol. 66, No. 12, pp. 6724-6733, Dec. 2018.
M. Boyuan, J. Pan, S. Huang, D. Yang, and Y. Guo, "Wide-beam dielectric resonator antennas based on the fusion of higher-order modes," IEEE Trans. Antennas Propag., vol. 69, No. 12, pp. 8866-8871, 2021.
S. Noghanian and L. Shafai, "Control of microstrip antenna radiation characteristics by ground plane size and shape," Antennas Propag. IEE Proc.—Microw., vol. 145, No. 3, pp. 207-212, Jun. 1998.
S. Long, M. McAllister, and L. Shen, "The resonant cylindrical dielectric cavity antenna," IEEE Trans. Antennas Propag., vol. 31, No. 3, pp. 406-412, May 1983.
W. Sun, W. Yang, P. Chu, and J. Chen, "Design of a wideband circularly polarized stacked dielectric resonator antenna," IEEE Trans. Antennas Propag., vol. 67, No. 1, pp. 591-595, Jan. 2019.
Z.-X. Xia, K. W. Leung, and K. Lu, "3-D-printed wideband multi-ring dielectric resonator antenna," IEEE Antennas Wirel. Propag. Lett., vol. 18, No. 10, pp. 2110-2114, Oct. 2019.
D. F. Kelley and W. L. Stutzman, "Array antenna pattern modeling methods that include mutual coupling effects," IEEE Trans. Antennas Propag., vol. 41, No. 12, pp. 1625-1632, Dec. 1993.

* cited by examiner

PHASED ARRAY ANTENNA AND ANTENNA FOR PHASED ARRAY ANTENNA

TECHNICAL FIELD

The invention relates to a phased array antenna and an antenna for a phased array antenna.

BACKGROUND

Phased array antenna can be used in various applications including radars and wireless telecommunication systems. Generally, a phased array antenna includes multiple antenna elements and it can scan electronically by applying variable phases or time delays to operate different ones of the antenna elements. However, the scan range of some existing phased array antennas may be limited due to significant gain loss at large scan angles caused by angular variation of the radiated field and effects of inter-element coupling. In other words, the phased array antenna may suffer from severe gain drop (e.g., larger than 3 dB in the scan range) when its beam steers in a wide range.

SUMMARY OF THE INVENTION

In a first aspect, there is provided an antenna for, or of, a phased array antenna. The antenna includes a substrate, a radiation element arranged on the substrate, and a radiation pattern shaping mechanism operable to reduce central radiation provided by the radiation element during operation. The central radiation may be a central radiation in H-plane and/or E-plane of the radiation element. The central radiation reduction corresponds to a central dip in the radiation pattern. The radiation pattern shaping mechanism is provided partly or entirely by structural component(s) of the antenna, hence can also be referred to as a radiation pattern shaping structure. In some embodiments, the antenna may also be used for non-phased array antenna.

The radiation pattern shaping mechanism may be further operable to increase a beamwidth of radiation provided by the radiation element during operation. The beamwidth of radiation may be a beamwidth of radiation in the H-plane and/or the E-plane of the radiation element.

The substrate may comprise, or consist of, one or more substrate layers and a ground plane. The ground plane is arranged on one side of the substrate. The substrate may be a printed circuit board (PCB) substrate, e.g., a single- or multi-layer PCB substrate.

The antenna further includes one or more feed mechanisms. Examples of the feed mechanism include a probe feed mechanism, a microstrip line feed mechanism, a coplanar waveguide feed mechanism, a slot feed mechanism, etc. In one example, the feed mechanism includes/is a slot feed mechanism that includes a feed slot formed in the ground plane and a microstrip line arranged on another side of substrate (the side opposite the side with the ground plane).

The radiation element may be arranged directly or indirectly on the substrate.

The antenna may be a dipole antenna, a patch antenna, a slot antenna, a dielectric resonator antenna, etc.

Optionally, the antenna is a dielectric resonator antenna, and the radiation element comprises or consists of a dielectric resonator element. The dielectric resonator element may be made of one or more dielectric materials, hence may include a dielectric constant (made of one dielectric material) or an effective dielectric constant (made by multiple dielectric materials). The dielectric resonator element may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, a cube, a polygonal prism, etc. The dielectric resonator element may be additively manufactured.

Optionally, the radiation pattern shaping mechanism comprises a radiation pattern shaping element that is arranged on the substrate and defines an opening that receives part of the dielectric resonator element. The radiation pattern shaping element may be arranged directly or indirectly on the substrate. The dielectric resonator element and the radiation pattern shaping element may be supported on the same surface, e.g., a substantially planar surface, which may be provided by the substrate or other structure(s) arranged on the substrate. The opening may be a through-hole. The radiation pattern shaping element may be arranged coaxially, or centrally, of the opening. A cross sectional shape of the radiation pattern shaping element and a cross sectional shape of the opening may be the same (the cross sectional size may or may not be the same). Optionally, the radiation pattern shaping element and the dielectric resonator element are not in direct contact. Optionally, a gap is defined between the radiation pattern shaping element and the dielectric resonator element. The gap may be annular. Optionally, the radiation pattern shaping element is a ring-shaped element that surrounds a lower portion (the portion closer to the substrate) of the dielectric resonator element. The ring-shaped element may refer to an element shaped to form a loop. The ring-shaped element may be annular. Optionally, a height of the radiation pattern shaping element is less than half of a height of the dielectric resonator element. Optionally, the radiation pattern shaping element is a metallic element made of one or more metallic materials. Optionally, the radiation pattern shaping element is additively manufactured.

Optionally, the radiation pattern shaping mechanism further comprises a dielectric element arranged on the dielectric resonator element. The dielectric element is operable to facilitate resonance (one or more modes) in the dielectric resonator element during operation. The dielectric element may be made of one or more dielectric materials, hence may include a dielectric constant (made of one dielectric material) or an effective dielectric constant (made by multiple dielectric materials). The dielectric constant or effective dielectric constant of the dielectric element may be less than the dielectric constant or effective dielectric constant of the dielectric resonator element such that a quasi-magnetic interface is formed between the dielectric element and the dielectric resonator element. The dielectric constant or effective dielectric constant of the dielectric element may be less than half of the dielectric constant or effective dielectric constant of the dielectric resonator element. A height of the dielectric element may be less than a height of the dielectric resonator element. The height of the dielectric element may be less than half of the height of the dielectric resonator element. The dielectric element and the dielectric resonator element may be coaxial and have the same cross sectional shape and/or size. The dielectric element may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, a cube, a polygonal prism, etc. The dielectric element may be additively manufactured. The dielectric element and the dielectric resonator element may be integrally formed. In one example, the dielectric element and the dielectric resonator element form a cylinder, which comprises or consists of the dielectric resonator element defining a lower cylindrical portion and the dielectric element defining an upper cylindrical portion.

Optionally, the dielectric element is a first dielectric element and the radiation pattern shaping mechanism further comprises a second dielectric element arranged on the first dielectric element. The second dielectric element may be made of one or more dielectric materials, hence may include a dielectric constant (made of one dielectric material) or an effective dielectric constant (made by multiple dielectric materials). The dielectric constant or effective dielectric constant of the second dielectric element may be larger than the dielectric constant or effective dielectric constant of the first dielectric element. The dielectric constant or effective dielectric constant of the second dielectric element may be at least two times the dielectric constant or effective dielectric constant of the first dielectric element. In one example, the dielectric constant or effective dielectric constant of the second dielectric element is the same as the dielectric constant or effective dielectric constant of the dielectric resonator element. A height of the second dielectric element may be less than the height of the first dielectric element. Two or all of the first dielectric element, the second dielectric element, and the dielectric resonator element may be coaxial. Two or all of the first dielectric element, the second dielectric element, and the dielectric resonator element may have the same cross sectional shape and/or size. The second dielectric element may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, a cube, a polygonal prism, etc. The second dielectric element may be additively manufactured. The first dielectric element and the second dielectric element may be integrally formed. The first dielectric element, the second dielectric element, and the dielectric resonator element may be integrally formed. In one example, the first dielectric element, the second dielectric element, and the dielectric resonator element form a cylinder, which comprises or consists of the dielectric resonator element defining a lower cylindrical portion, the first dielectric element defining a middle cylindrical portion, and the second dielectric element defining an upper cylindrical portion. A top end, or surface, of the second dielectric element may provide a quasi-magnetic interface, which helps to adjust field distribution. In one example, the radiation pattern shaping mechanism consists of the first dielectric element, the second dielectric element, and the dielectric resonator element.

In one embodiment in which the feed mechanism of the antenna comprises a slot feed mechanism with a feed slot, the antenna may further include a dielectric layer arranged on the substrate between the substrate and the dielectric resonator element. The feed slot and the dielectric resonator element define a gap therebetween, which may case mismatch and/or frequency shift. The dielectric layer may reduce mismatch and/or frequency shift caused by the gap. The dielectric layer is a low-permittivity dielectric layer.

In one embodiment, the antenna is operable only in or at least in X-band. The antenna may operate in additional or alternative frequency bands.

The antenna is operable as a transmitter antenna. The antenna may further be operable as a receiver antenna or transceiver antenna.

In a second aspect, there is provided a phased array antenna having at least one of the antenna of the first aspect. Each of the at least one of the antenna of the first aspect may act as an antenna element for the phased array antenna. The phased array antenna may provide a scan range of at least ±50°, at least ±60°, at least ±70°, at least ±75°, or at least ±80°, with a gain fluctuation (in the scan range) less than 2, less than 1.5, less than 1.25, less than 1.2, less than 1.1, less than 1.0, or less than 0.9 dB.

In a third aspect, there is provided a phased array antenna having a substrate, at least two radiation elements arranged on the substrate, and at least two radiation pattern shaping mechanisms. Each of the at least two radiation pattern shaping mechanisms is associated with a respective one of the at least two radiation elements and is operable to reduce central radiation provided by the corresponding radiation element during operation. The at least two radiation pattern shaping mechanisms are provided partly or entirely by structural component(s) of the phased array antenna.

The at least two at radiation elements may include more than two radiation elements arranged in an array. The array may be a 1D array or a 2D array. The array may be a linear array or a planar array. The array may have a triangular lattice structure or a rectangular lattice structure. The at least two radiation elements may be identical radiation elements or radiation elements of different types, shapes, forms, and/or sizes. The radiation elements may be dielectric resonator elements.

The phased array antenna may provide a scan range of at least ±50°, at least ±60°, at least ±70°, at least ±75°, or at least ±80°, with a gain fluctuation (in the scan range) less than 2, less than 1.5, less than 1.25, less than 1.2, less than 1.1, less than 1.0, or less than 0.9 dB.

In one embodiment, each of the at least two radiation elements comprises a respective dielectric resonator element, and the at least two radiation pattern shaping mechanisms may be provided, at least, by a single radiation pattern shaping element. The single radiation pattern shaping element is arranged on the substrate and defines at least two openings each receiving part of the respective dielectric resonator element. The radiation pattern shaping element may be shaped as a cylinder, a prism, etc.

The at least two radiation pattern shaping mechanisms may each further include at least one dielectric element (e.g., slab) arranged on the respective dielectric resonator element. The at least one dielectric element may be the first dielectric element and optionally the second dielectric element of the first aspect.

In one embodiment, at least one of the radiation pattern shaping mechanisms may be the radiation pattern shaping mechanism of the first aspect.

The phased array antenna is operable as a transmitter antenna, and may further be operable as a receiver antenna or a transceiver antenna.

In a fourth aspect, there is provided an electronic device/system having the antenna of the first aspect. The electronic device/system may be a communication device/system.

In a fifth aspect, there is provided an electronic device/system having the phased array antenna of the second aspect. The electronic device/system may be a communication device/system.

In a sixth aspect, there is provided an electronic device/system having the phased array antenna of the third aspect. The electronic device/system may be a communication device/system.

In a seventh aspect, there is provided a method for constructing a phased array antenna with multiple antenna elements. The method may be at least partly implemented by a computer, e.g., processor(s). The method includes: determining isolated element pattern of a single antenna element of the phased array antenna based on array factor of the phased array antenna and an array beam envelope (gain profile) of the phased array antenna and taking into account the mutual coupling effects associated with the antenna elements; determining a design of a single antenna element based on the determined isolated element pattern; and fabricating the phased array antenna based on the design of the single antenna element.

Optionally, the method further includes determining a design of the phased array antenna based on the single antenna element, and the fabricating of the phased array antenna is based on the design of the phased array antenna.

Optionally, the method further comprises: defining the array beam envelope (gain profile) for the phased array antenna $G_a$; determining a design of an initial antenna element and a design of a corresponding phased array antenna with multiple ones of the initial antenna elements based on array information for the phased array antenna, determining array beam envelope of a mutual-coupling-included array factor associated with the phased array antenna $G_{AF}$, and determining active reflection coefficients $\Gamma_n(\theta)$ of each of the feed ports in the designed phased array antenna under different scan angles; and the determining of the isolated element pattern further comprises determining the isolated element pattern $G_o$ based on the defined array beam envelop and the mutual-coupling-included array factor.

Optionally, the method further comprises: receiving input associated with the array beam envelope (gain profile) for the phased array antenna $G_a$; receiving input associated with a design of an initial antenna element and a design of a corresponding phased array antenna with multiple ones of the initial antenna elements based on array information for the phased array antenna, determining array beam envelope of a mutual-coupling-included array factor associated with the phased array antenna $G_{AF}$, and determining active reflection coefficients $\Gamma_n(\theta)$ of each of the feed ports in the designed phased array antenna under different scan angles; and the determining of the isolated element pattern further comprises determining the isolated element pattern $G_o$ based on the defined array beam envelop and the mutual-coupling-included array factor. One or more of these steps may be performed using a computer.

The array beam envelope may be substantially constant in target scan range. The array beam envelope may drop off rapidly outside the target scan range. The array beam envelope can be expressed as $$G_a(\theta) = \frac{4\pi f_0^2(\theta)}{N\eta_0}\left[N^2 - \left|\sum_{n=1}^{N}\Gamma_n(\theta)\right|^2\right],$$

where $\theta$ is scan angle, $f_o(\theta)$ is the normalized field pattern for the antenna element, $\eta_o$ is wave impedance of free space, N is the total number of antenna elements in the phased array antenna.

The mutual-coupling-included array factor can be expressed as $$G_{AF}(\theta) = \frac{1}{N}\left[N^2 - \left|\sum_{n=1}^{N}\Gamma_n(\theta)\right|^2\right],$$

where $\theta$ is scan angle, $\Gamma_n(\theta)$ represents the active reflection coefficient of the n-th antenna element when the main beam scans to $\theta$, and N is the total number of antenna elements in the phased array antenna.

The isolated element pattern can be expressed as $$G_0(\theta) = \frac{4\pi f_0^2(\theta)}{\eta_0},$$

where $\theta$ is scan angle, $f_o(\theta)$ is the normalized field pattern for the antenna element, and $\eta_o$ is wave impedance of free space.

In one example, the determining the isolated element pattern $G_o$ based on the defined array beam envelop and the mutual-coupling-included array factor is based on the following equation: $G_0(\theta)=G_a(\theta)/G_{AF}(\theta)$.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, practical applications, etc. In one example, when a value is modified by terms of degree such as "about", such expression includes the stated value ±15%, ±10%, ±5%, ±2%, or ±1%.

Unless otherwise specified, the terms "connected", "coupled", "mounted", or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Figure 1:
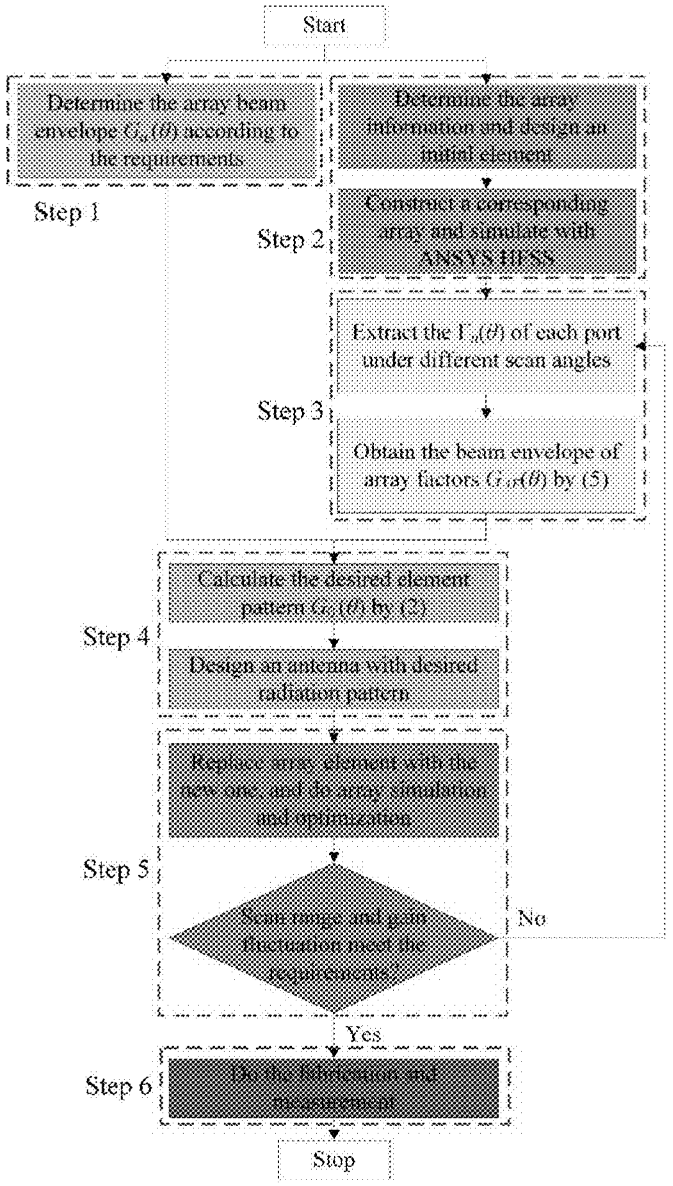
FIG. 1 is a flowchart illustrating a method for constructing a phased array antenna in one embodiment.

According to "R. C. Hansen, *Phased Array Antennas, 2nd ed.* Hoboken, NJ, USA: Wiley, 2009", a real array pattern can be decomposed into an isotropic array factor (IAF), an isolated element pattern (IEP), and an impedance mismatch factor (IMF). Conventionally, an active element pattern (AEP) approach is used for array pattern evaluation including mutual coupling. The active element pattern is the product of the isolated element pattern and the impedance mismatch factor. For a large array, the active element pattern of a central antenna element of the array antenna can approximately represent the active element patterns of almost all the other antenna elements of the array antenna. Thus, the array pattern can be predicted using the active element pattern of the central antenna element. Problematically, however, it may be time-consuming to obtain an active element pattern since a sufficiently large array has to be used for such a simulation. In addition, this active element pattern method may not be suitable for array antenna with small or moderate sized array because the mutual coupling effect may vary significantly among the elements in array of such scale.

The inventors of the invention have devised, through research, experiments, and trials, a technique based on gain-compensating approach to address the gain drop problem of phased array antenna. In one example of the proposed approach, isolated element pattern (IEP) and array factor are jointly considered. When calculating the array factor, mutual couplings between antennas in an array are also included. The isolated element pattern is optimized in such a way that the element gain is nearly inversely proportional to the peak gain of the array factor. As a result, the peak gain of the overall array beam can be kept almost the same in a wide scan range. The inventors of the invention have realized, that to mitigate the gain fluctuation and/or reduce the array optimization complexity, the mutual coupling effects need to be considered in the antenna element design stage when designing the phased array antenna.

The inventors of the invention have devised, through research, experiments, and trials, an isolated element pattern approach as an alternative to the active element pattern approach. In one example of the isolated element pattern approach, instead of the active element pattern, the isolated element pattern is optimized to widen the scan range without significant gain drop. By merging the impedance mismatch factor into the isotropic array factor, the optimal isolated element pattern can be determined from the desired array pattern and the impedance-mismatch-factor-included isotropic array factor. The inventors of the invention have devised, that for an ideal wide-angle scan phased array, the peak array gain is nearly constant over the scan range, and thus the isolated element pattern and beam envelop of the impedance-mismatch-factor-included isotropic array factor are complementary to each other. Based on this, the inventors of the invention have devised an isolated element pattern based gain-complementing technique to calculate the optimal element pattern for wide-angle scan phased arrays with low gain fluctuations.

The technique of gain complementation based on the isolated element pattern approach for phased array is first explained with reference to an ideal linear array.

In a linear phased array with N antenna elements, the conventional isotropic array factor can be given by $$AF = \sum_{n=1}^{N} e^{j(n-1)\psi} \tag{1}$$

where $\psi = kd\sin\theta + \beta$, k is the wavenumber, d is the inter-element spacing, θ is the scan angle, and β is the progressive phase. In any main lobe direction, ψ equals o, and the gain of isotropic array factor reaches its maximum N. Therefore, the beam envelope of the isotropic array factors under different scan angles is a constant N. However, mutual coupling cannot be avoided in a practical phased array and usually causes significant gain drops at large scan angles. In one embodiment, called the isolated element pattern approach, all mutual coupling effects are accounted for in the array factor. Under this premise, a technique of gain complementation between the isolated element pattern and beam envelope of the impedance-mismatch-factor-included isotropic array factors is presented for wide-angle scan phased arrays with low gain fluctuation.

By setting the isolated element pattern as $G_o(\theta)$, and defining the array beam envelope as $G_a(\theta)$ and the beam envelope of impedance-mismatch-factor-included isotropic array factors as $G_{AF}(\theta)$, the following can be obtained: $G_a(\theta) = G_o(\theta) G_{AF}(\theta)$.

When $G_a(\theta)$ and $G_{AF}(\theta)$ are given, the desired $G_o(\theta)$ can be simply calculated by $$G_0(\theta) = G_a(\theta)/G_{AF}(\theta) \tag{2}$$

where $-90° \le \theta \le 90°$.

For a uniformly excited and equally spaced N-element linear array with a scan angle θ, $G_a(\theta)$, $G_o(\theta)$, and $G_{AF}(\theta)$ can be written as $$G_a(\theta) = \frac{4\pi f_0^2(\theta)}{N\eta_0}\left[N^2 - \left|\sum_{n=1}^{N}\Gamma_n(\theta)\right|^2\right] \tag{3}$$

$$G_0(\theta) = \frac{4\pi f_0^2(\theta)}{\eta_0} \tag{4}$$

$$G_{AF}(\theta) = \frac{1}{N}\left[N^2 - \left|\sum_{n=1}^{N}\Gamma_n(\theta)\right|^2\right] \tag{5}$$

where $f_o(\theta)$ is the normalized field pattern for element, $\eta_o$ is the wave impedance of free space, and $\Gamma_n(\theta)$ represents the active reflection coefficient of the n-th element when the main beam scans to θ.

Generally speaking, the active reflection coefficient $\Gamma_n(\theta)$ is difficult to calculate in advance, and this makes it difficult to obtain an accurate $G_{AF}(\theta)$. This is because $\Gamma_n(\theta)$ is determined by many factors, such as antenna structure, inter-element spacing, number of elements, etc. In addition, $\Gamma_n(\theta)$ varies between elements in an array. However, $\Gamma_n(\theta)$ can be extracted using an electromagnetic solver, such as ANSYS HFSS.

For a wide-angle scan phased array, $G_a(\theta)$ is nearly constant over the scan range, and thus $G_o(\theta)$ and $G_{AF}(\theta)$ are complementary to each other. Based on this relationship, an iterative process is developed to design a wide-angle scan phased array.

FIG. 1 shows a flowchart of a method for constructing (including designing) a phased array antenna in one embodiment. In this embodiment the method mainly includes six steps.

Step 1: Define a desired normalized $G_a(\theta)$. For a phased array antenna, the ideal beam envelop should be constant in its target scan range and drop rapidly outside the range. In one example, $G_a(\theta)$ can be expressed as follows:

$$G_a(\theta) = \begin{cases} \cos^n(\theta + \theta_{Aim}), & -90° \le \theta < -\theta_{Aim} \\ 1, & -\theta_{Aim} \le \theta \le \theta_{Aim} \\ \cos^n(\theta - \theta_{Aim}), & \theta_{Aim} < \theta < 90° \end{cases} \tag{6}$$

where $0° < \theta_{Aim} < 90°$. In this example, the gain of the main beam is 1 within $\pm\theta_{Aim}$ and begins to drop after exceeding $\pm\theta_{Aim}$, and the drop rate is determined by the coefficient rt.

Step 2: Determine array information, including the inter-element spacing and number of elements of the array antenna, and design an initial antenna element for the first iteration. Construct a corresponding array and perform simulation, e.g. using ANSYS HFSS.

Step 3: Obtain tentative $G_{AF}(\theta)$ according to equation (5), by extracting the active reflection coefficients of all ports in the array under different scan angles.

Step 4: Calculate desired isolated element pattern using equation (2), and design antenna based on (e.g., to meet) the initial target radiation pattern (isolated element pattern). It can be found that the isolated element pattern is generally complementary to the array factor envelope within the concerned scan range.

Step 5: Construct a new array model with the newly designed element from the Step 4 and perform simulation, e.g., using ANSYS HFSS, to verify scan performance of the array.

Step 6: If the array requirements are met, fabricate the phased array antenna and perform measurements.

If the array requirements are not met in Step 6, the method may return to Step 3.

Figure 2:
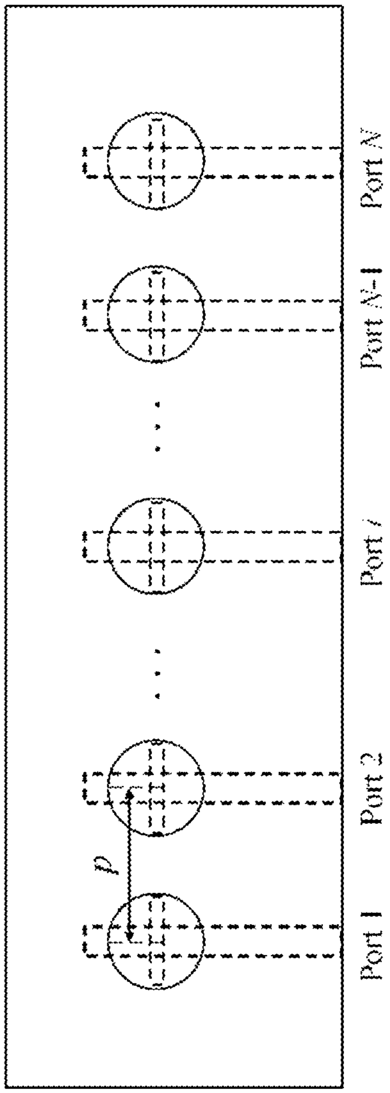
FIG. 2 is a schematic diagram of a multi-element linear cylindrical dielectric resonator array.

To more clearly illustrate the relationship between $G_a(\theta)$, $G_{AF}(\theta)$, and $G_o(\theta)$, an example N-element linear antenna array is constructed based on a slot-fed cylindrical DRA, as shown in FIG. 2. It should be noted that the proposed technique can be applied to any kind of antenna element with desired radiation pattern.

According to FIG. 1, the first step is to determine $G_a(\theta)$. In this example, equation (6) is used for $G_a(\theta)$ with $\theta_{Aim}=60°$ and n=20. Next, the inter-element spacing is set to half wavelength and the element number N is set to 18, and $G_{AF}(\theta)$ can be obtained using ANSYS HFSS. Finally, the desired element pattern $G_o(\theta)$ can be calculated based on equation (2).

Figure 3:
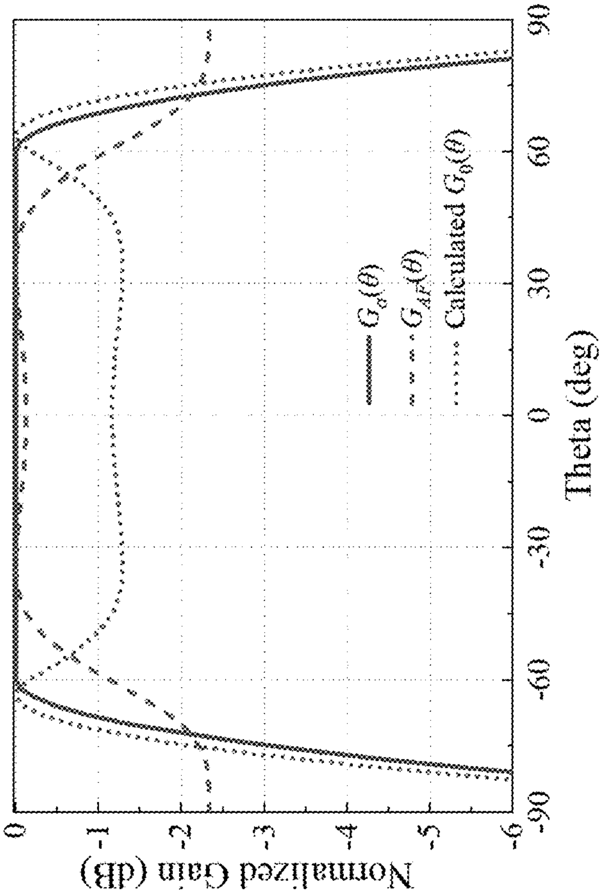
FIG. 3 is a graph showing normalized curves (normalized gain in dB vs scan angle in degrees) of array beam envelope $G_a(\theta)$ for a phased array antenna, isolated element pattern $G_o(\theta)$ for the phased array antenna, and mutual-coupling-included array factor $G_{AF}(\theta)$ for the phased array antenna.

FIG. 3 shows the normalized curves of $G_a(\theta)$, $G_{AF}(\theta)$, and $G_o(\theta)$. As shown in FIG. 3, $G_{AF}(\theta)$ and $G_o(\theta)$ are generally complementary to each other within $\pm\theta_{Aim}$.

The target scan range $\pm\theta_{Aim}$ in $G_a(\theta)$ is the main factor that affects the desired isolated element pattern.

Figure 4:
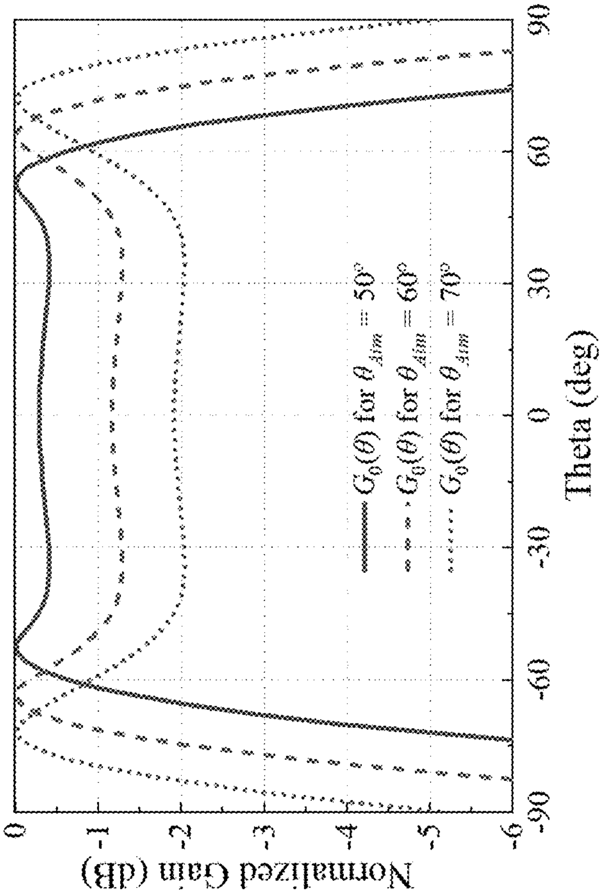
FIG. 4 is a graph showing normalized curves (normalized gain in dB vs scan angle in degrees) of different isolated element patterns $G_o(\theta)$ for different target scan ranges $\theta_{Aim}$ (normalized gain in dB vs scan angle in degrees)

FIG. 4 shows different desired isolated element patterns for various target scan ranges (±50 degrees, ±60 degrees, and ±70 degrees). As shown in FIG. 4, for a larger scan range, a broader beamwidth and a deeper center dip in the element pattern is needed. Therefore, a wide-beam element pattern with a center dip (central radiation reduction) can be designed first for a wide-angle scan array with stable peak gain.

Figure 5:
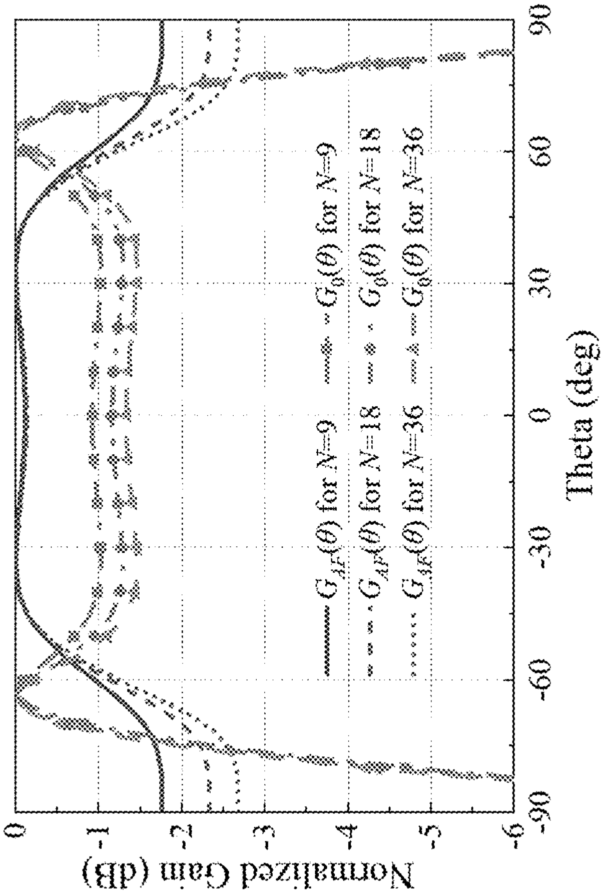
FIG. 5 is a graph showing normalized curves (normalized gain in dB vs scan angle in degrees) of different mutual-coupling-included array factors $G_{AF}(\theta)$ and different isolated element patterns $G_o(\theta)$ for different number of antenna elements in the phased array antenna.

The number of elements N can also affect the shape of the desired element pattern. FIG. 5 shows different $G_{AF}(\theta)$ and $G_o(\theta)$ for different numbers of elements N. With reference to FIG. 5, $G_{AF}(\theta)$ drops faster at large angles as N increases. As seen from FIG. 5, the depth of the center dip also needs to be adjusted as N varies.

From the above it can be determined that a wide-beam element pattern with a center dip is required for a wide-angle scan phased array with low gain fluctuation.

Although the method of the above example is described with reference to a phased array antenna with a one-dimensional (1D) linear phased array, it should be noted that the method is not limited to such and may also apply to a phased array antenna with a two-dimensional (2D) phased array.

To verify the above design concept, or more generally, to provide an improved or alternative antenna, the invention provides an antenna for a phased array antenna.

The antenna generally includes a substrate, a radiation element arranged directly or indirectly on the substrate, and a radiation pattern shaping mechanism operable to reduce central radiation provided by the radiation element during operation. The central radiation may be a central radiation in H-plane and/or E-plane of the radiation element. The central radiation reduction corresponds to a central dip in the radiation pattern. The radiation pattern shaping mechanism is provided at least partly by structural component(s). The radiation pattern shaping mechanism may be further operable to increase a beamwidth of radiation provided by the radiation element during operation. The beamwidth may be a beamwidth of radiation in the H-plane and/or the E-plane of the radiation element.

The antenna may be a dipole antenna, a patch antenna, a slot antenna, a dielectric resonator antenna, etc. and the antenna further includes a feed mechanism which may be a probe feed mechanism, a microstrip line feed mechanism, a coplanar waveguide feed mechanism, a slot feed mechanism, etc.

The antenna may be a dielectric resonator antenna and the radiation element may include a dielectric resonator element, which may be made of one or more dielectric materials, hence may include a dielectric constant or an effective dielectric constant. The dielectric resonator element may be shaped as a cylinder, a prism, etc., and it may be additively manufactured.

The substrate may include one or more substrate layers and a ground plane arranged on one side of the substrate. The substrate may be provided by a PCB substrate, e.g., a single- or multi-layer PCB substrate.

The radiation pattern shaping mechanism may include a radiation pattern shaping element arranged directly or indirectly on the substrate and defining an opening, e.g., a through-hole, which receives part of the dielectric resonator element. The dielectric resonator element and the radiation pattern shaping element may be supported on the same surface, e.g., substantially planar surface, which may be provided by the substrate or other structure(s) arranged on the substrate. The radiation pattern shaping element may be arranged coaxially, or centrally, of the opening. A cross sectional shape of the radiation pattern shaping element and a cross sectional shape of the opening may be the same (the cross sectional size may not be the same). The radiation pattern shaping element and the dielectric resonator element may not be in direct contact. A gap, which may be annular, may be defined between the radiation pattern shaping element and the dielectric resonator element. The radiation pattern shaping element may be a ring-shaped element, which may be annular, that surrounds a lower portion (the portion closer to the substrate) of the dielectric resonator element. A height of the radiation pattern shaping element may be less than (e.g., less than half of) a height of the dielectric resonator element. The radiation pattern shaping element may be a metallic element. The radiation pattern shaping element may be additively manufactured.

The radiation pattern shaping mechanism may further include a dielectric element (e.g., dielectric slab) arranged on the dielectric resonator element, e.g., to facilitate resonance (one or more modes) in the dielectric resonator element during operation. A dielectric constant or effective dielectric constant of the dielectric element may be less than (e.g., less than half of) the dielectric constant or effective dielectric constant of the dielectric resonator element such that a quasi-magnetic interface may be formed between the dielectric element and the dielectric resonator element. A height of the dielectric element may be less than (e.g., less than half of) a height of the dielectric resonator element. The dielectric element and the dielectric resonator element may be coaxial and have the same cross sectional shape and/or size. The dielectric element may be shaped as a cylinder, a prism, etc. The dielectric element may be additively manufactured. The dielectric element and the dielectric resonator element may be integrally formed. The dielectric element and the dielectric resonator element form a cylinder.

The radiation pattern shaping mechanism may further include another dielectric element (e.g., dielectric slab) arranged on the dielectric element. A dielectric constant or effective dielectric constant of the other dielectric element may be larger than (e.g., larger than two times) the dielectric constant or effective dielectric constant of the dielectric element. The dielectric constant or effective dielectric constant of the other dielectric element may be the same as the dielectric constant or effective dielectric constant of the dielectric resonator element. A height of the other dielectric element may be less than a height of the dielectric element. The dielectric elements and the dielectric resonator element may be coaxial. The dielectric elements and the dielectric resonator element may have the same cross sectional shape and/or size. The other dielectric element may be shaped as a cylinder, a prism, etc. The other dielectric element may be additively manufactured. The dielectric element and the other dielectric element may be integrally formed. The dielectric element, the other dielectric element, and the dielectric resonator element may be integrally formed. In one example, the dielectric element, the other dielectric element, and the dielectric resonator element form a cylinder. A top end, or surface, of the other dielectric element may provide a quasi-magnetic interface, which helps to adjust field distribution.

The antenna may include a slot feed mechanism with a feed slot and a low-permittivity dielectric layer arranged on the substrate between the substrate and the dielectric resonator element. The feed slot and the dielectric resonator element define a gap. The dielectric layer may reduce mismatch and/or frequency shift caused by the gap.

The antenna may be operable in only or at least X-band. The antenna is operable as a transmitter antenna, and may further be operable as a receiver antenna or a transceiver antenna.

Figure 6A:
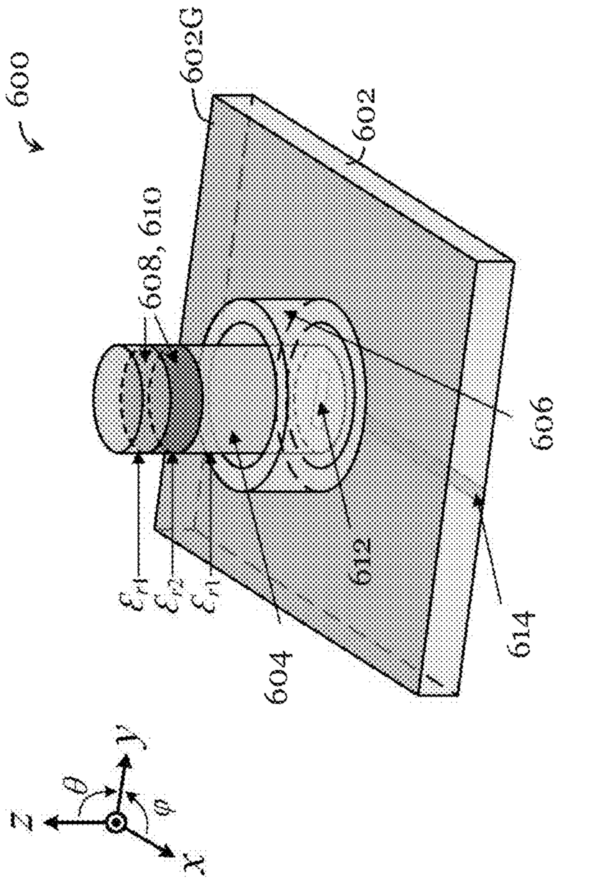
FIG. 6A is a schematic diagram (perspective view) of a dielectric resonator antenna in one embodiment.
Figure 6B:
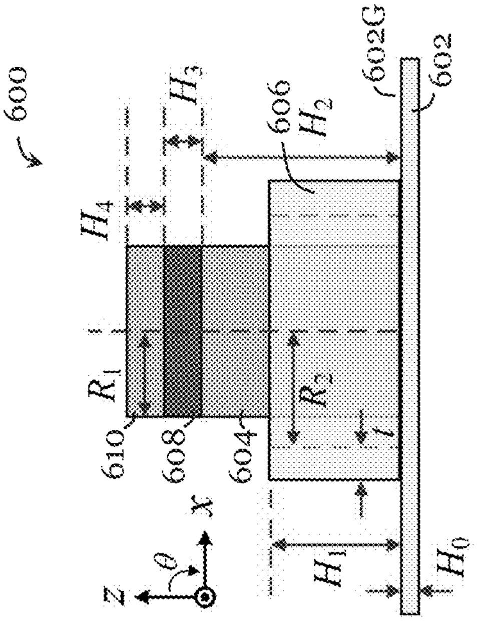
FIG. 6B is a side view of the dielectric resonator antenna of FIG. 6A.
Figure 6C:
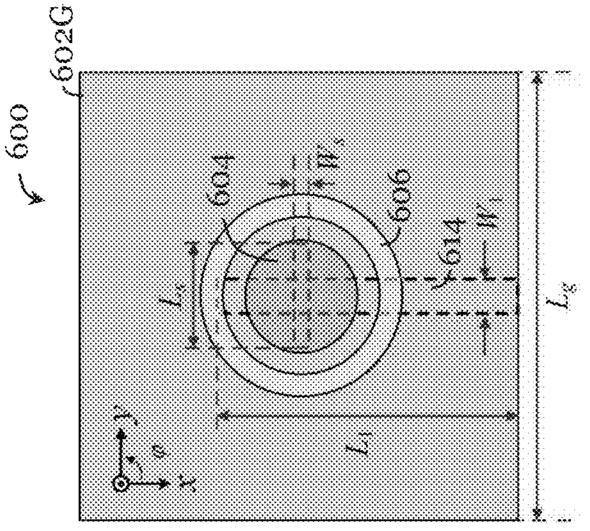
FIG. 6C is a top view of the dielectric resonator antenna of FIG. 6A.

FIGS. 6A to 6C illustrate an example of an antenna 600 for a phased array antenna in one embodiment. The antenna 600 includes a substrate 602 and a dielectric resonator element 604, as a radiation element, arranged on the substrate 602, and a radiation pattern shaping mechanism. The radiation pattern shaping mechanism includes a metal ring 606 arranged on the substrate 602 and two dielectric slabs 608, 610 arranged on the dielectric resonator element 604, and is operable to reduce central radiation provided by the dielectric resonator element 604 during operation.

Referring to FIGS. 6A to 6C, in this embodiment, the dielectric resonator element 604 is cylindrical with a radius of $R_1$, a height of $H_2$, and a dielectric constant of $\varepsilon_{r1}$. The dielectric resonator element 604 is mounted on the substrate 602 provided by a printed circuit board (PCB) with a square shaped cross section. The PCB has a side length of $L_g$, a thickness of $H_o$, and a substrate dielectric constant of $\varepsilon_{rs}$. A ground plane is formed on the top surface of the PCB. Beneath the dielectric resonator element 604 is a rectangular slot 612 with a length of $L_s$ and a width of $W_s$, etched in the ground plane 602G for exciting the dielectric resonator element 604. The annular metal ring 606 has an inner radius of $R_2$, a thickness of t, and a height of $H_1$. The annular ring 606 is placed on the PCB to surround the lower part of the dielectric resonator element 604. Two dielectric slabs 608, 610, one on top of another, with heights of $H_3$ and $H_4$, and dielectric constants of $\varepsilon_{r2}$ and $\varepsilon_{r1}$, respectively, are loaded on top of the dielectric resonator element 604. The dielectric slabs 608, 610 and the dielectric resonator element 604 are each cylindrical and they together define a cylinder. A 50Ω microstrip line 614 with a length of $L_1$ and a width of $W_1$ is printed on the bottom side of the PCB. The microstrip line 614 and the slot 612 form part of the slot feed mechanism of the antenna 600. The antenna 600 is designed for operation at X-band. ANSYS HFSS is used to simulate and optimize the performance of the antenna 600. A prototype antenna 1400 is fabricated and measurements are performed. The dielectric constants used for the antenna 600, 1400 are $\varepsilon_{r1}$=10±0.35, $\varepsilon_{r2}$=3±0.1, and $\varepsilon_{rs}$=3.38±0.05. The design parameters used for the antenna 600, 1400 are $L_g$=29111111, $L_s$=6.1 mm, $L_1$=20.2 mm, $W_s$=0.4 mm, $W_1$=1.82 mm, t=1.5 mm, $R_1$=3.45 mm, $R_2$=5 mm, $H_o$=0.813 mm, $H_1$=4 mm, $H_2$=8.6 mm, $H_3$=2 mm, $H_4$=1 mm. It should be noted that in some embodiments the profile of the dielectric resonator element 604 can be reduced by using a higher dielectric constant for the dielectric resonator element 604 and/or by increasing the radius to height ratio of the dielectric resonator element 604.

Figure 7:
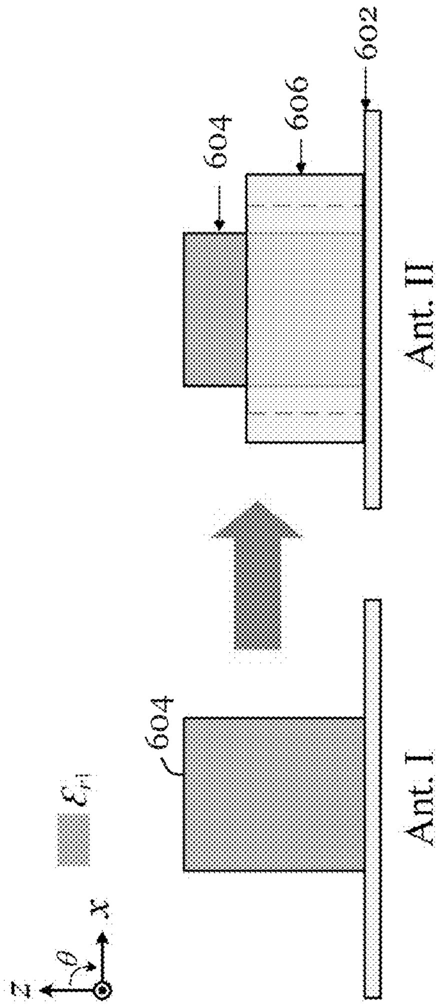
FIG. 7 is a schematic diagram illustrating an antenna design process (stage I) in one embodiment, showing a design "Ant. I" before modification and a design "Ant. II" after modification.

FIG. 7 shows stage I of the design process of the antenna 600. This stage can be referred to as the wide-beam design stage. In FIG. 7, antenna "Ant. I" is a basic slot-fed dielectric resonator antenna with a cylindrical dielectric resonator element 604 operable in the $HEM_{11\gamma}$ mode. A large height to radius ratio is selected to obtain a small footprint. In this example "Ant. I" is transformed to "Ant. II" by adding a metal ring 606 around the cylindrical dielectric resonator element 604, which helps introduce a center dip (central radiation reduction) in the radiation pattern and broaden the beamwidth of the antenna 600.

Figure 8A:
FIG. 8A is a plot of simulated complex magnitude E-field distribution in the x-z plane at 10.35 GHz for the design "Ant. I" in FIG. 7.
Figure 8B:
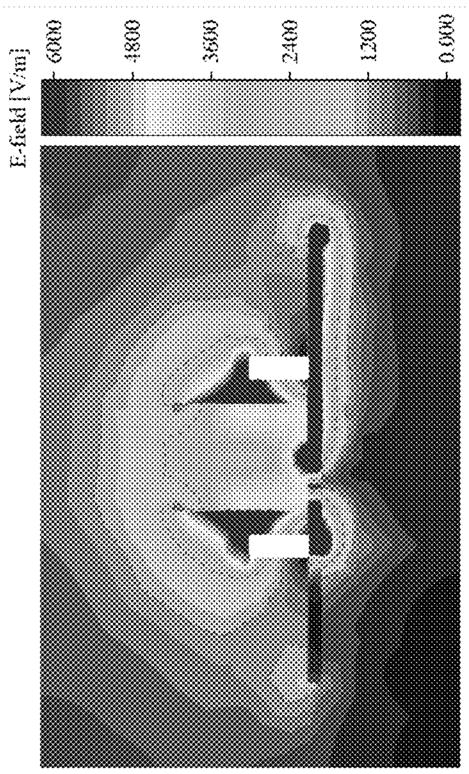
FIG. 8B is a plot of simulated complex magnitude E-field distribution in the x-z plane at 10.35 GHz for the design "Ant. II" in FIG. 7.

FIGS. 8A and 8B show the simulated x-z-plane complex magnitude of the total E-field distributions of "Ant. I" and "Ant. II", respectively. It can be seen form FIGS. 8A and 8B that the near-field distributions in "Ant. I" and "Ant. II" are very different. As shown in FIG. 8A, energy radiates evenly from the dielectric resonator element 604 in "Ant. I", resulting in a general broadside radiation pattern. As shown in FIG. 8B, the bottom energy of dielectric resonator element 604 is confined by the metal ring 606 and diffracts at the edge of the metal ring 606. This makes more energy divert to the side directions off the boresight, leading to a wide-beam radiation pattern. The height of the metal ring 606 in "Ant. II" can affect the propagation path of electromagnetic (EM) waves and change the far-field radiation patterns.

Figure 9:
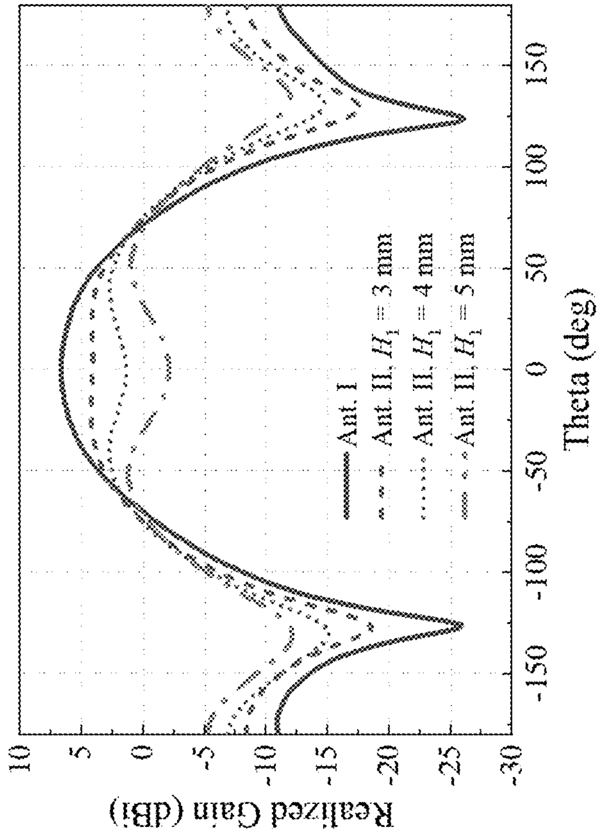
FIG. 9 is a graph showing simulated radiation patterns (normalized gain in dB vs scan angle in degrees) in H-plane for the design "Ant. I" in FIG. 7 and the design "Ant. II" in FIG. 7 with different metal ring height $H_1$ values (dielectric resonator element height $H_2$=9 mm, microstrip line length $L_1$=19.6 mm)

FIG. 9 shows the comparison of simulated H-plane radiation patterns between "Ant. I" and "Ant. II" with different $H_1$ (with $H_2$=9 mm, $L_1$=19.6 mm, and values of other parameters are the same as listed above). The simulated results in the E-plane are similar to those in the H-plane and not shown here for brevity. With reference to FIG. 9, the 3 dB beamwidth is significantly broadened by loading the metal ring 606 and is mainly controlled by the height $H_1$ of the ring 606. Besides, a center dip in the radiation pattern can also be formed with a suitable $H_1$, which is desirable.

Figure 10:
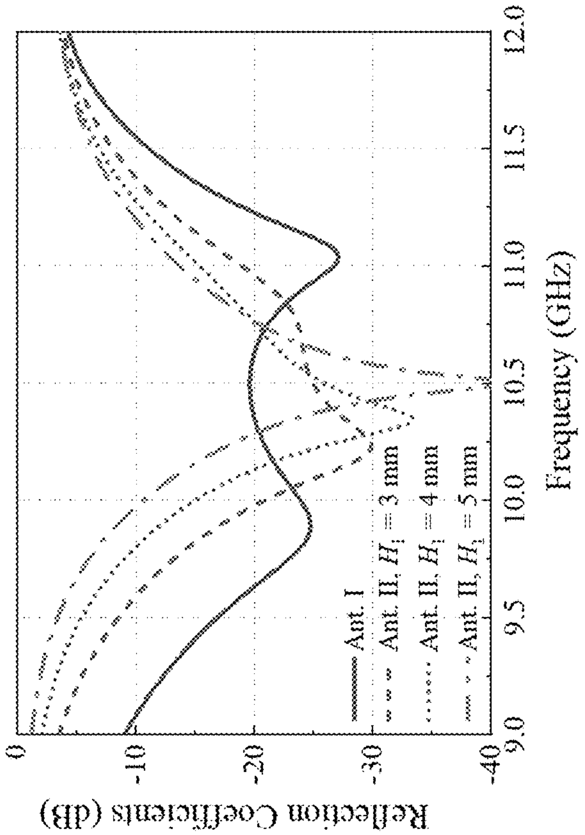
FIG. 10 is a graph showing simulated reflection coefficients $|S_{11}|$ (dB) for the design "Ant. I" in FIG. 7 and the design "Ant. II" in FIG. 7 with different metal ring height $H_1$ (dielectric resonator element height $H_2$=9 mm, microstrip line length $L_1$=19.6 mm)

FIG. 10 shows the simulated reflection coefficients of "Ant. I" and "Ant. II" with different $H_1$. ($H_2$=9 mm, $L_1$=19.6 mm, and values of other parameters are the same as listed above). With reference to FIG. 10, the 10 dB impedance bandwidth is narrowed by loading the metal ring 606, and it decreases as $H_1$ increases. This is because the Q factor of resonance is increased by the metal ring 606 and leads to a narrower bandwidth.

Figure 11:
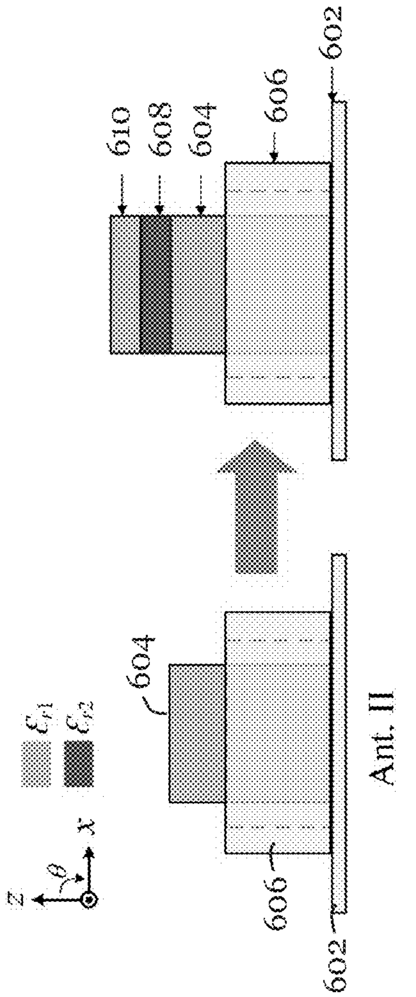
FIG. 11 is a schematic diagram illustrating an antenna design process (stage II) in one embodiment, showing a design "Ant. II" of FIG. 7 (before modification) and a dielectric resonator antenna design in one embodiment (after modification)

FIG. 11 shows stage II of the design process of the antenna 600. This stage can be referred to as the shaped-beam design stage. In this stage, the shape of center dip in the element pattern is further adjusted and extra parasitic structures are introduced. As shown in FIG. 11, in this stage, two dielectric slabs 608, 610 are placed on top of the dielectric resonator element 604, forming a dielectric cylinder. The upper dielectric slab 610 has the same dielectric constant of Sri as the dielectric resonator element 604, whereas the lower dielectric slab has a much lower dielectric constant of Ere.

Figure 12:
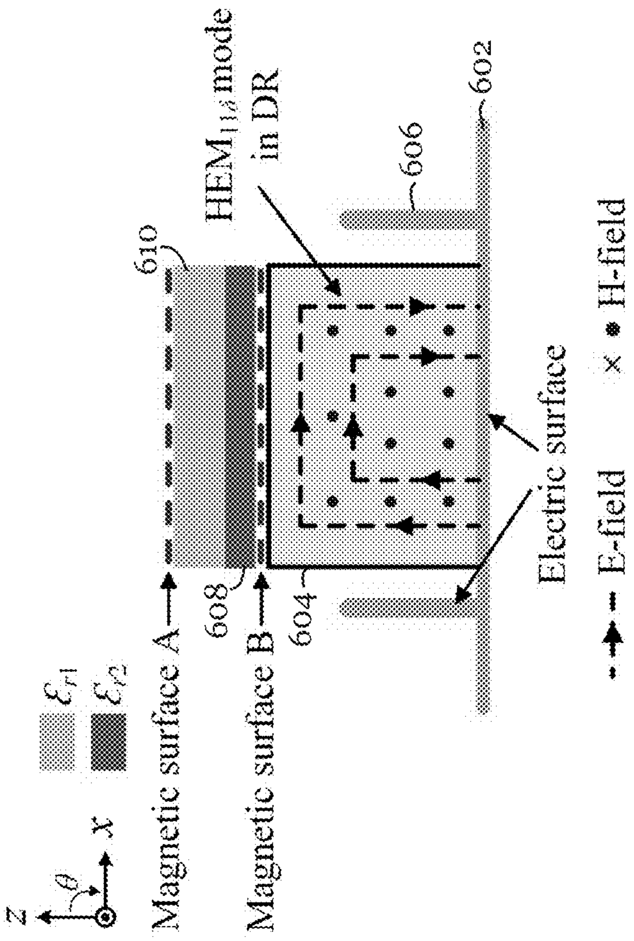
FIG. 12 is a simplified equivalent model of the dielectric resonator antenna design of FIG. 11.

FIG. 12 shows a simplified equivalent model of the antenna design (after modification, with slabs) in FIG. 11. Due to the difference in dielectric constants, two quasi magnetic surfaces (where upward waves are bounced back with no phase changes) A and B, are formed, for waves travelling from the feed slot to the upper space. The lower magnetic surface B mainly helps form the $HEM_{11\delta}$ resonance in the dielectric resonator element 604, whereas the upper magnetic surface A helps to adjust field distribution in the dielectric slab 610, and thus the far fields can be tailored to some extent.

Figure 13:
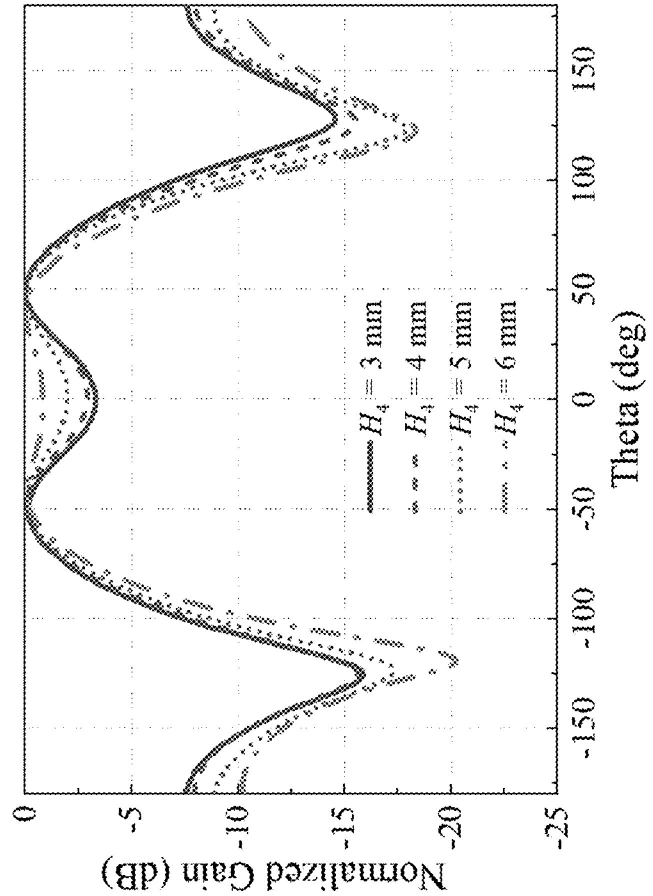
FIG. 13 is a graph showing simulated radiation patterns (normalized gain in dB vs scan angle in degrees) of the dielectric resonator antenna of FIG. 11 in H-plane with different upper dielectric slab height $H_4$ (metal ring height $H_1$=5 mm)

FIG. 13 shows simulated radiation patterns of the antenna design (after modification, with slabs) in FIG. 11 in H-plane with different $H_4$. ($H_1$=5 mm and values of other parameters are the same as listed above). With reference to FIG. 13, the shape of the center dip in the radiation pattern is effectively controlled by the height of dielectric slab 610 whereas the beamwidth is almost unchanged. This feature may be useful in designing phased arrays with stable scan gain.

Figure 14A:
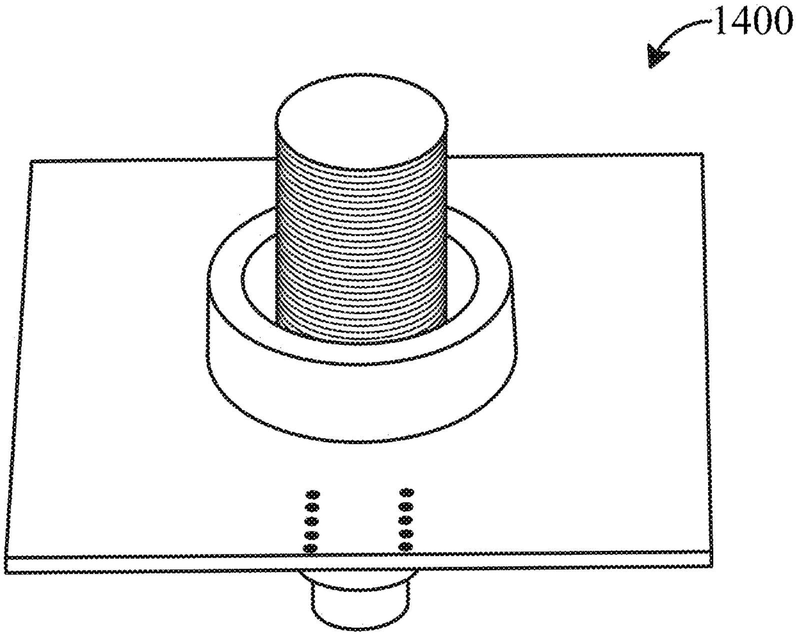
FIG. 14A is a photograph (perspective view) of a dielectric resonator antenna fabricated based on the design of FIG. 11.
Figure 14B:
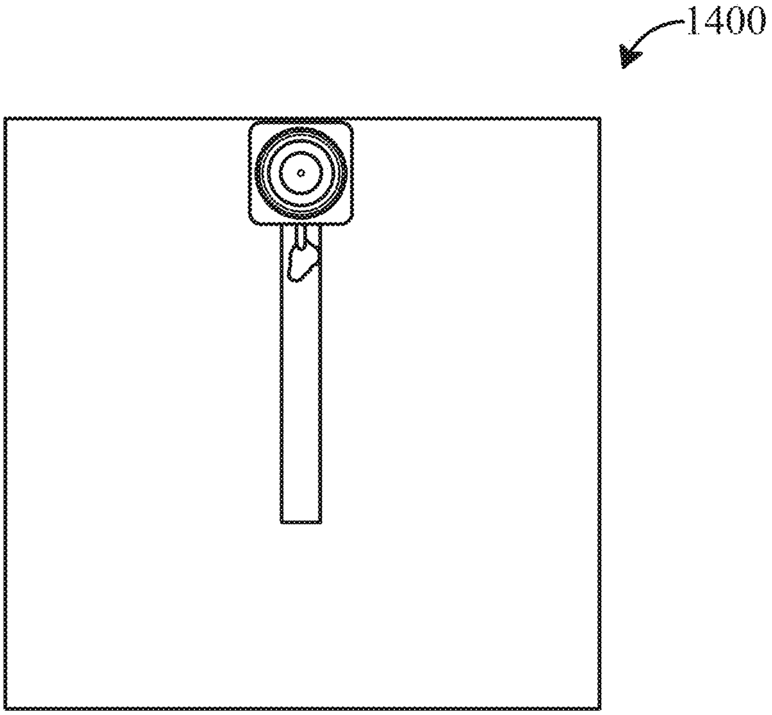
FIG. 14B is a photograph (bottom view) of the dielectric resonator antenna of FIG. 14A.

FIGS. 14A and 14B illustrate a prototype antenna 1400 fabricated based on the design of antenna 600 using the values of parameters listed above. In this example, the cylindrical dielectric block of antenna 1400, including the dielectric resonator element and the two dielectric slabs, is additively manufactured integrally. Tests are performed on the prototype antenna 1400 to verify its performance. Specifically, the reflection coefficient is measured with an Agilent vector network analyzer E5230A, and the radiation patterns and realized gains are measured with a Satimo StarLab system.

Figure 15:
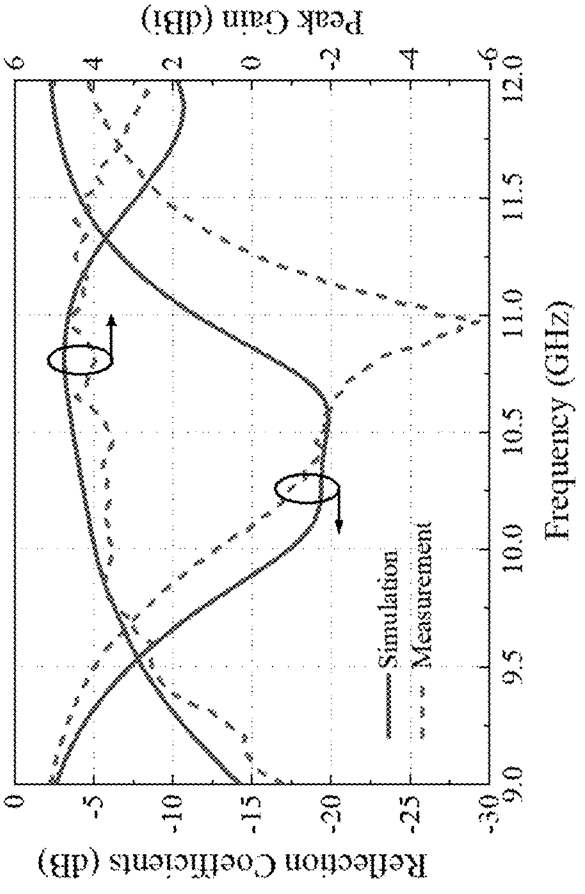
FIG. 15 is a graph showing measured and simulated reflection coefficients (dB) and peak gains (dBi) of the dielectric resonator antenna of FIG. 14A.

FIG. 15 shows the measured and simulated reflection coefficients, and peak realized gains of the antenna 1400. With reference to FIG. 15, the measured and simulated 10 dB impedance bandwidths are 14.9% (9.86 GHz to 11.45 GHz) and 13.5% (9.66 GHz to 11.06 GHz), respectively. The measured peak realized gain varies between 3.5 dBi and 4.5 dBi, whereas the simulated peak realized gain varies between 3.2 dBi and 4.6 dBi, both within the overlapping bandwidths. A frequency shift of 2.8% exists between the measured and simulated results. This is mainly due to the fabrication and experimental tolerance/error. The inventors have devised that this might be caused by the air gap between the dielectric resonator element and the feed slot during the manual assembly.

Figure 16:
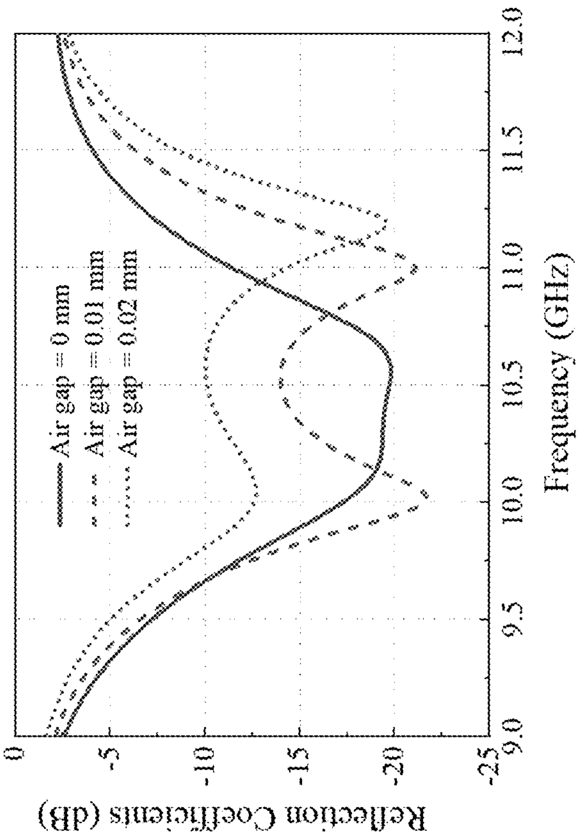
FIG. 16 is a graph showing simulated reflection coefficients (dB) of the dielectric resonator antenna of FIG. 14A with different air gap sizes between the dielectric resonator element and the feed slot.

FIG. 16 shows the simulated reflection coefficients of the antenna 1400 at 10.65 GHz with different air gap sizes. With reference to FIG. 16, a tiny air gap can lead to an apparent frequency shift and this may explain the discrepancy observed in FIG. 15.

Figure 17:
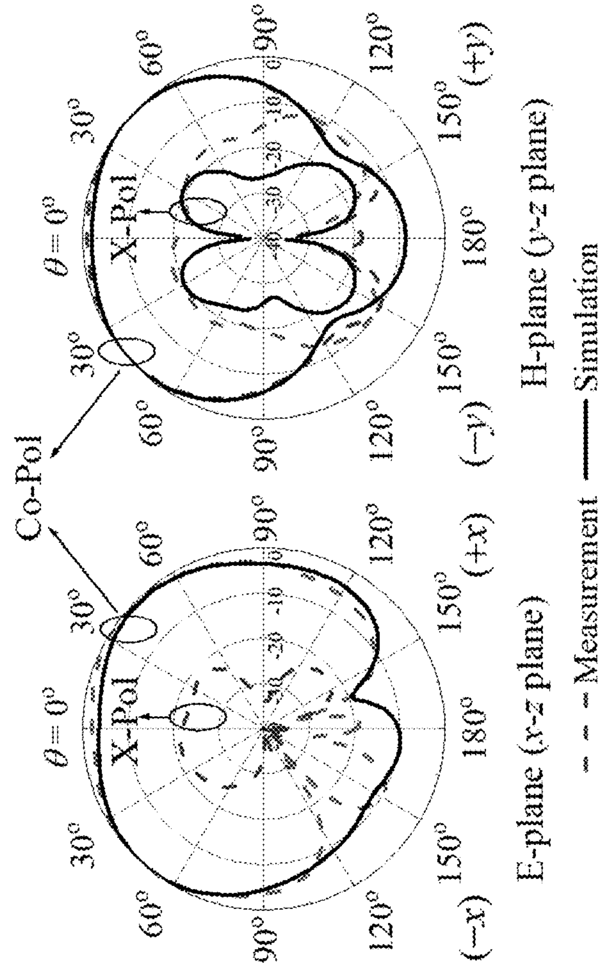
FIG. 17 is a plot of measured and simulated radiation patterns of the dielectric resonator antenna of FIG. 14A at 10.65 GHz.

FIG. 17 shows the measured and simulated radiation patterns of the antenna 1400 at 10.65 GHz. As shown in FIG. 17, reasonable agreement between the measured and simulated results can be observed, and wide-beam radiation patterns with center dips are obtained in both E- and H-planes. The measured E- and H-plane beamwidths of the antenna 1400 are 172° and 149°, respectively. The measured co-polar fields are stronger than the cross-polar fields by at least 18 dB in both principal planes. The simulated cross-polar field in E-plane is much weaker than the measurement and cannot even be shown in FIG. 17.

Table I below summarizes some performance and function of the antenna 1400.

TABLE I

| Antenna type | HPBW in E-plane and H-plane | Footprint* ($\lambda_o^2$)* | Radiation pattern shaping mechanism | Complexity | Beam shaping ability |
|---|---|---|---|---|---|
| Dielectric resonator antenna | 172°, 149° | 0.45 × 0.45 | metal ring + dielectric slabs | low | Yes |

*Footprint of the main radiator (ground plane not included), $\lambda_o$ is the free space wavelength at the center frequency.

The above design of antenna 600, 1400 can be applied to construct a wide-angle phased array antenna. In some embodiments, there is provided a phased array antenna include one or more of the antenna 600, 1400 as antenna element. The phased array antenna may provide a scan range of at least ±50°, at least ±60°, at least ±70°, at least ±75°, or at least ±80°, with a gain fluctuation less than 2, less than 1.5, less than 1.25, less than 1.2, less than 1.1, less than 1.0, or less than 0.9 dB in the scan range. It should be noted that a low gain fluctuation over a wide scan range will inevitably lead to a slightly-reduced peak gain of the array antenna.

Figure 18A:
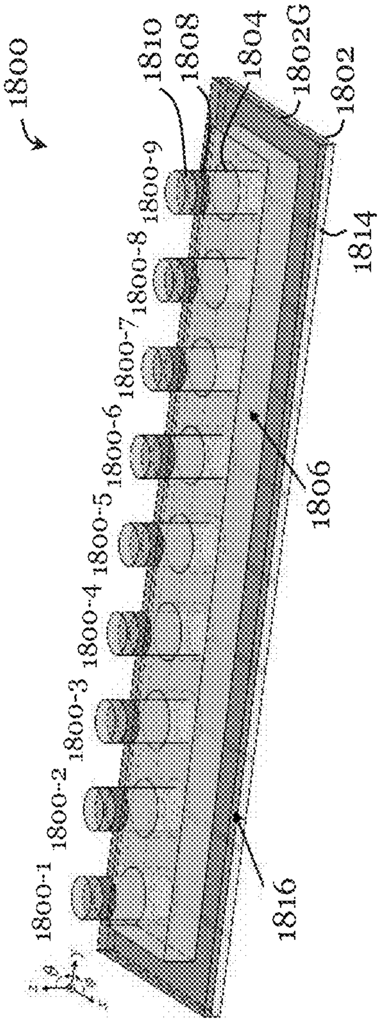
FIG. 18A is diagram (perspective view) of a dielectric resonator phased array antenna in one embodiment.
Figure 18B:
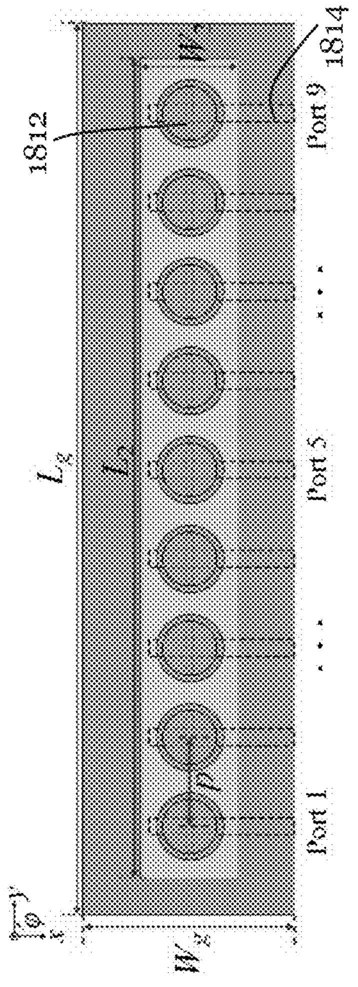
FIG. 18B is a top view of the dielectric resonator phased array antenna of FIG. 18A.

As an example, the design of antenna 600 is used to construct a 9-element H-plane linear phased array antenna 1800. FIGS. 18A and 18B show the phased array antenna 1800 with 9 antenna elements 1800-1 to 1800-9. Because the antenna elements 1800-1 to 1800-9 in the antenna 1800 are generally identical, and which is generally the same as the antenna 600, like reference plus "1200" is used to refer to the same/like feature (e.g., substrate 602 corresponds to substrate 1802, dielectric resonator element 604 corresponds to dielectric resonator element 1804, etc.). Also, for simplicity, reference numbers are not repeated for different identical antenna elements. The following discussion focus on which is different or not described with respect to antenna 600.

In this embodiment, the antenna 1800 has an inter-element spacing of p (p=0.45$\lambda_o$, where $\lambda_o$ is the free space wavelength at 10.35 GHz). Each antenna element 1800-1 to 1800-9 includes two dielectric slabs placed on top of the dielectric resonator element, as explained above with respect to antenna 600. However, unlike the antenna 600, in antenna 1800, the loading metal ring 606 is replaced with a generally rectangular metal block 1806 with multiple openings each receiving a respective one of the dielectric resonator elements 1804 (its base/lower portion). Compared with using multiple metal rings, the use of the single metal block 1806 has little effect on the radiation performance because the bottom electric boundary remains almost the same. Compared with using multiple metal rings, the use of the single metal block 1806 can significantly reduce assembly complexity. If metal rings are used (they can be used, in some other embodiments), the dielectric resonator elements of each antenna element of the array has to be aligned one by one, which can be challenging and/or time-consuming. Another difference in this design in FIG. 18A compared with the design of the antenna 600 relates to the ground plane. To alleviate the air gap effect mentioned above, a low-permittivity dielectric layer 1816 with a thickness of $H_5$ and a dielectric constant of 3 is attached to the ground plane 1802G of the substrate 1802 before integrating the dielectric cylinders. As the difference in dielectric constant between air and the extra dielectric layer 1816 is sufficiently small, the effective dielectric constant loading on the feed slot 1812 would not change significantly even if an air gap is introduced during assembly or manufacture of the antenna 1800. Therefore, the mismatching and frequency shift problems caused by the air gap would be relieved.

The phased array antenna 1800 is simulated and optimized at X-band with ANSYS HFSS. A prototype antenna 1900 is fabricated and measurements are performed. The dielectric constants used for the antenna 1800, 1900 are $\varepsilon_{r1}$=10±0.35, $\varepsilon_{r2}$=3±0.1, and $\varepsilon_{rs}$=3.38±0.05. The design parameters used for the antenna 1800, 1900 are $L_g$=125 mm, $L_s$=9.6 mm, $L_1$=21 mm, $L_2$=117 mm, $W_1$=1.82 mm, $W_2$=13 mm, $W_s$=0.4 Min, $W_G$=29 mm, $R_1$=3.45 MM, $R_2$=5 mm, $H_o$=0.813 mm, $H_1$=3.1 mm, $H_2$=9 MM, $H_3$=2 mm, $H_4$=6.4 mm, $H_5$=0.6 mm.

Figure 19A:
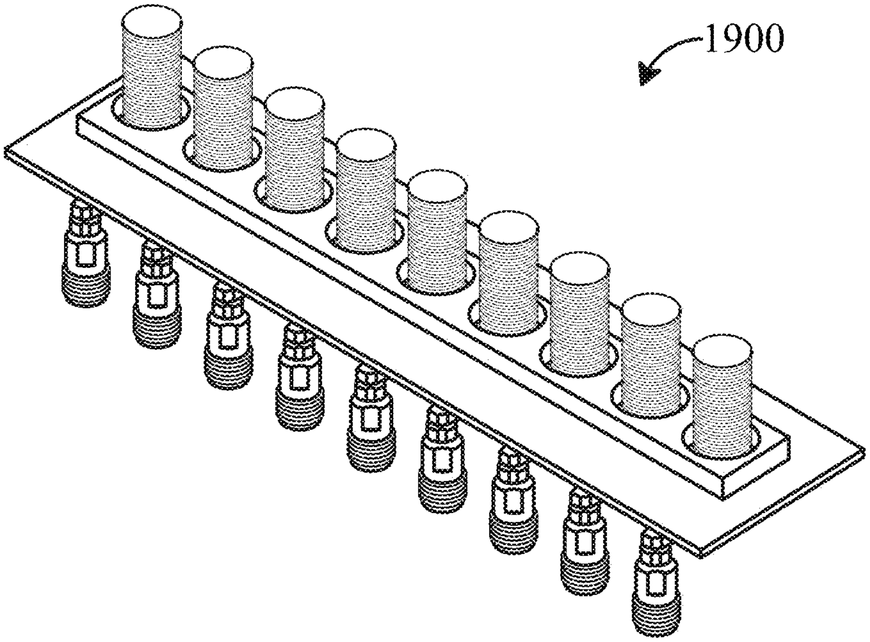
FIG. 19A is a photograph (perspective view) of a dielectric resonator phased array antenna fabricated based on the design of FIG. 18A.
Figure 19B:
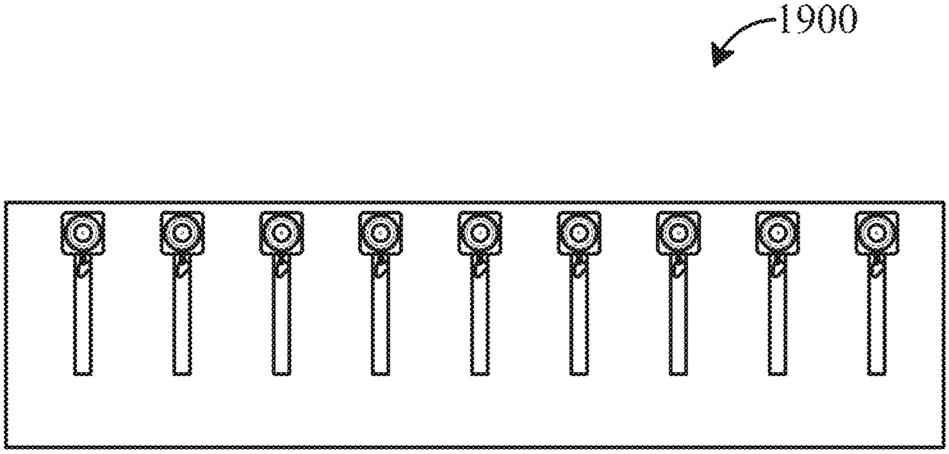
FIG. 19B is a photograph (bottom view) of the dielectric resonator phased array antenna of FIG. 19A.

FIGS. 19A and 19B show the prototype phased array antenna 1900 fabricated based on the design of antenna 1800 using the values of parameters listed above (with numbers 1-9 shown for the dielectric resonator antenna elements). In this example, the cylindrical dielectric block of antenna 1800, including the dielectric resonator element and the two dielectric slabs, is additively manufactured integrally. The metal block is also additively manufactured. Tests are performed on the prototype phased array antenna 1900 to verify its performance. Specifically, the reflection coefficient is measured with an Agilent vector network analyzer E5230A, and the radiation patterns and realized gains are measured with a Satimo StarLab system.

Figure 20:
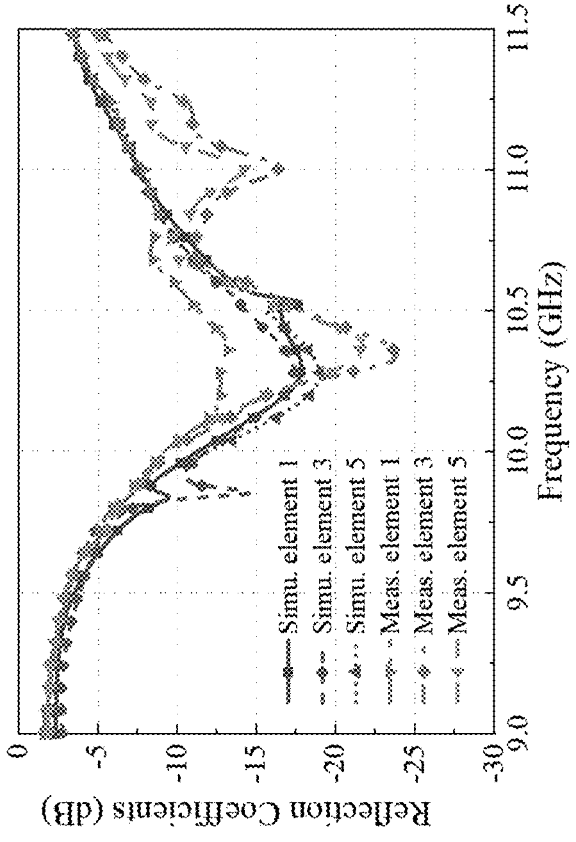
FIG. 20 is a graph showing measured and simulated reflection coefficients (dB) of element 1, element 3, and element 5 of the dielectric resonator phased array antenna of FIG. 19A.

FIG. 20 shows the measured and simulated reflection coefficients of elements 1, 3, and 5 of the phased array antenna 1900. With reference to FIG. 20, reasonable agreement between the measured and simulated results can be observed, and the frequency shift is much smaller compared to the element case due to the low-permittivity dielectric layer. The measured reflection coefficients have an overlapping 10 dB impedance bandwidth of 5.2% (10.04 GHz to 10.58 GHz).

Figure 21:
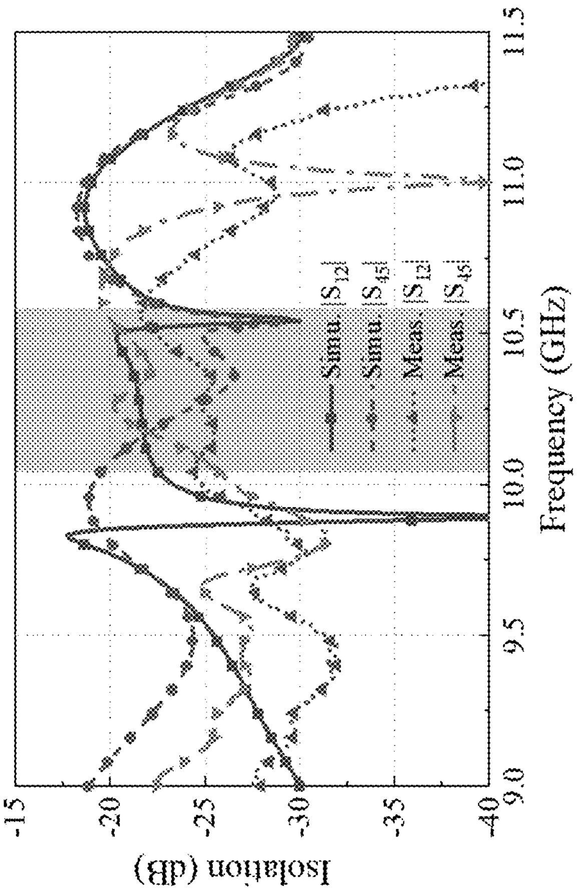
FIG. 21 is a graph showing measured and simulated isolation between adjacent elements of the dielectric resonator phased array antenna of FIG. 19A.

FIG. 21 shows the measured and simulated isolation between adjacent elements. With reference to FIG. 21, the measured and simulated $|S_{12}|$ and $|S_{45}|$ are all smaller than −19 dB within the impedance bandwidth.

To better understand the impedance matching during operation (scanning), the active reflection coefficients at different scan angles are also studied. The active reflection coefficient at the m-th port can be calculated by using $$\Gamma_m(\theta) = e^{jkmd\sin\theta}\sum_{n=1}^{N} S_{mn}e^{-jknd\sin\theta} \tag{7}$$

where $S_{mn}$ is the passive S-parameter in complex form, k is the wavenumber, d is the inter-element spacing, and θ is the scan angle.

The measured active reflection coefficients of each element at different scan angles are obtained with equation (7) using the measured passive S-parameter matrix.

Figure 22A:
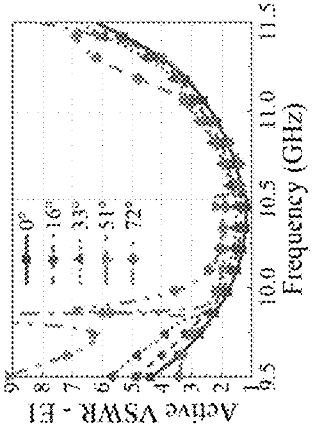
FIG. 22A is a graph showing simulated active voltage standing wave ratio (VSWR) of element 1 of the dielectric resonator phased array antenna of FIG. 19A.
Figure 22B:
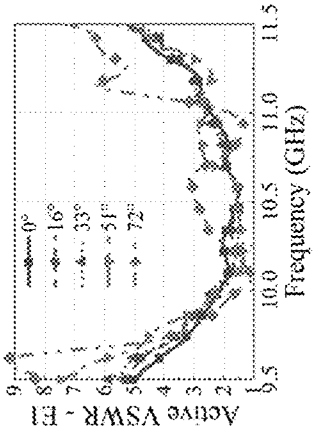
FIG. 22B is a graph showing measured active VSWR of element 1 of the dielectric resonator phased array antenna of FIG. 19A.
Figure 22C:
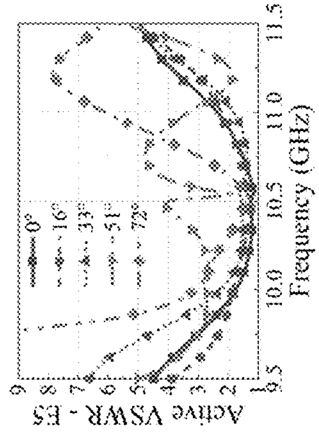
FIG. 22C is a graph showing simulated active VSWR of element 5 of the dielectric resonator phased array antenna of FIG. 19A.
Figure 22D:
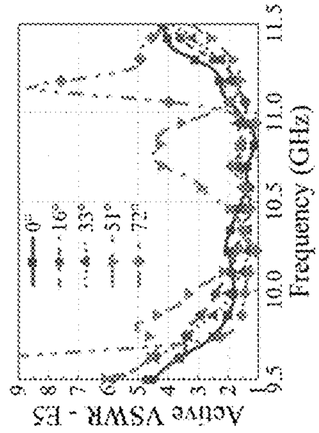
FIG. 22D is a graph showing measured active VSWR of element 5 of the dielectric resonator phased array antenna of FIG. 19A.
Figure 22E:
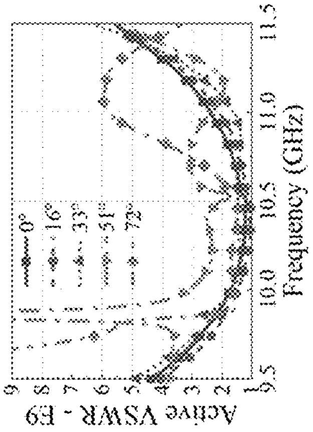
FIG. 22E is a graph showing simulated active VSWR of element 9 of the dielectric resonator phased array antenna of FIG. 19A.
Figure 22F:
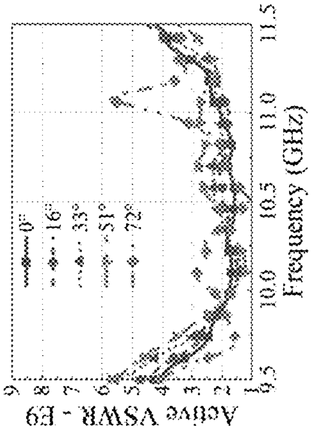
FIG. 22F is a graph showing measured active VSWR of element 9 of the dielectric resonator phased array antenna of FIG. 19A.

FIGS. 22A to 22F show the measured and simulated active voltage standing wave ratio (VSWR) of elements 1, 5, and 9 at different scan angles. Specifically FIGS. 22A and 22B show measured and simulated results of element 1 respectively, FIGS. 22C and 22D show measured and simulated results of element 5 respectively, and FIGS. 22E and 22F show measured and simulated results of element 9 respectively.

As shown in FIGS. 22A-22F, the active VSWR deteriorates at large angles due to the strong mutual coupling. This is reasonable because this design is not optimized for wide-angle impedance matching. Overall, almost all the active VSWRs of the dielectric resonator antenna elements in the array, except for element 5, are smaller than 3 within the concerned bandwidth. The discrepancy between measured and simulated results is mainly caused by the fabrication and experimental tolerance/error.

In one example, array pattern for the phased array antenna 1900 is obtained using a unit-excitation active element pattern (UEAEP) method. In the UEAEP method, the array scan performance can be synthesized from the active element patterns without approximation. The active element pattern, which includes the mutual coupling effects, is measured for each element in the array of the phased array antenna 1900. During the whole measurement process, the phased array antenna 1900 is always fixed to the turntable to keep the relative position information between elements unchanged. When measuring the active element pattern of one element, the cable with excitation signal is connected to that one element, while the other elements are connected or terminated with 50Ω matched loads. By measuring the antenna elements one by one, nine different active element patterns are obtained. With the assumption of uniform amplitudes and different progressive phases, the measured active element patterns are post-processed to calculate the array patterns at different scan angles.

Figure 23A:
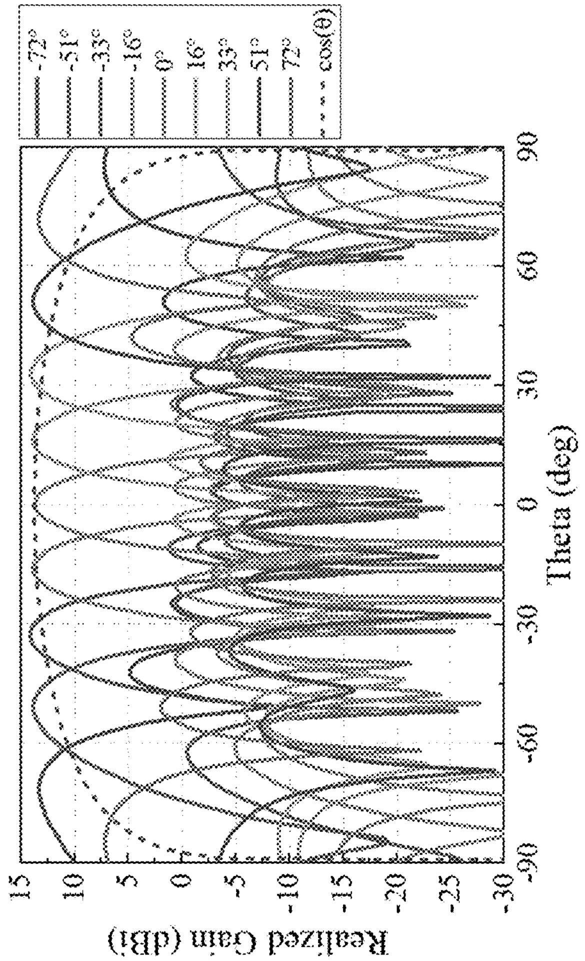
FIG. 23A is a graph showing simulated scan performance patterns (realized gain in dB vs scan angle in degrees) of the dielectric resonator phased array antenna of FIG. 19A.
Figure 23B:
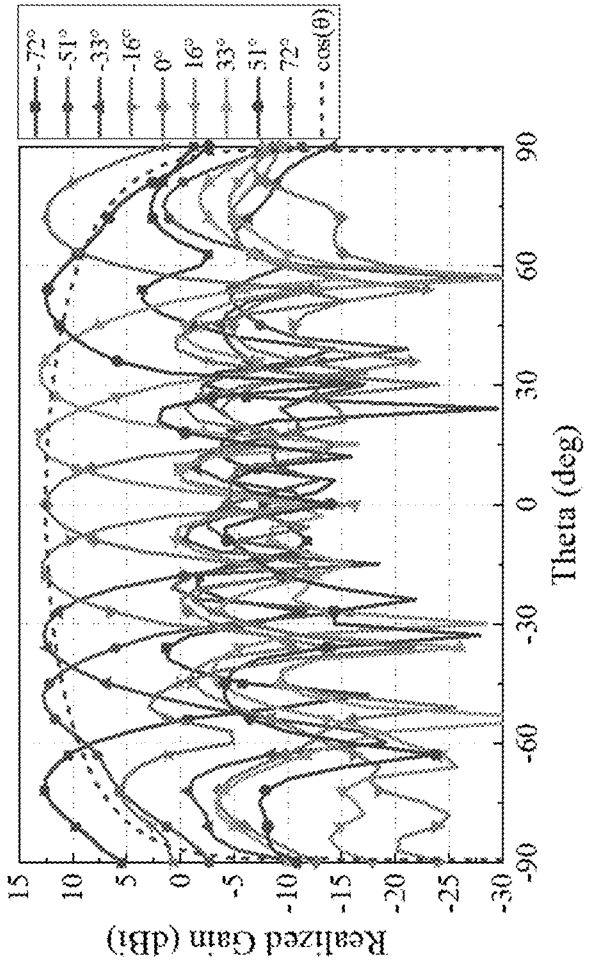
FIG. 23B is a graph showing measured scan performance patterns (realized gain in dB vs scan angle in degrees) of the dielectric resonator phased array antenna of FIG. 19A.

FIGS. 23A and 23B show the measured and simulated scan performance of the phased array antenna 1900 at 10.35 GHz. A function of cos(θ) is also plotted in FIGS. 23A and 23B for comparison. As illustrated, the phased array antenna 1900 gains along scan angles do not drop like the function of cos(θ). This is because the array gain is intentionally reduced at the broadside while improved at large angles. The flexible control of array gain is mainly attributed to the shaped-beam radiation pattern of the dielectric resonator antenna element. With reference to FIG. 23A, the simulated main beam can scan from −72° to +72° while the peak gain only varies between 13.3 dBi and 14.1 dBi, and the peak side lobe level (SLL) is smaller than −6.1 dB over the wide scan range. With reference to FIG. 23B, the measured main beam can scan from −72° to +72° with a gain variation between 12.5 dBi and 13.4 dBi, and the maximum side lobe level is less than −6.9 dB over the concerned scan range. The discrepancy between the measured and simulated results is mainly due to the fabrication and experimental tolerance/error. The side lobe level can be further suppressed by optimizing the input amplitude distribution.

Table II below summaries some key performance and function of the antenna 1400.

TABLE II

| Antenna type | Scan range | Gain fluctuation (dB) | Peak side lobe level (dB) | Technique used to design wide-beam elements | Complexity |
|---|---|---|---|---|---|
| Dielectric resonator antenna | ±72° | 0.9 | −6.9 | parasitic loading | low |

The above embodiments of the invention have provided a new technique of gain complementation for phased arrays (phased array antenna) with stable scan gain. In these embodiments, a wide-beam radiation pattern with a center dip is needed for an optimized element in a phased array for wide-angle scan. The technique is demonstrated using different example antenna designs.

More generally, the invention provides a technique of designing wide-angle scanning phased arrays, or phased array antenna, with low gain fluctuations. This technique can obtain the optimal isolated element pattern with the consideration of mutual coupling effects for a phased array of any size. It can be realized by counting the mutual couplings in the array factor. The optimal isolated element pattern can be derived from the desired array beam envelope and the beam envelope of new array factors. In general, the antenna element of the invention has a wide-beam pattern and beam shaping ability suitable for specific applications. Some embodiments of the invention have provided a shaped-beam cylindrical dielectric resonator antenna, loaded with a peripheral metal ring and two top dielectric slabs, and which has wide beamwidths with a center dip (adjustable by design) in both E- and H-planes. Some embodiments of the invention have provided a multi-element H-plane linear phased array, of which the H-plane main beam can scan in a wide range with a very low gain fluctuation. Some embodiments of the invention can steer the stable high-gain beam flexibly and quickly in a large coverage for searching or tracking targets. Some embodiments of the invention are particularly suitable for radars and various wireless communications applications.

Some embodiments of the invention may include one or more of the following advantages. In some embodiments of the invention, the gain-complementing technique can obtain optimal isolated element pattern with the consideration of mutual coupling effects for a phased array of any size. It can effectively reduce the gain fluctuations and simplify the array optimization procedure. In some embodiments of the invention, the antenna, e.g., shaped-beam antenna, can flexibly control the center dip in the element pattern whereas the beamwidth is almost unchanged. This property can compensate for the gain drops of the main beam at large scan angles. In some embodiments of the invention, the phased array antenna can steer the high-gain beam in a wide range with a very low gain fluctuation. Some embodiments of the invention may include one or more other advantages not specifically described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the summary section. Some embodiments of the invention may include one or more of these optional features (some of which are not specifically illustrated in the drawings). Some embodiments of the invention may lack one or more of these optional features (some of which are not specifically illustrated in the drawings). For example, the invention can be applied to array antenna with different array lattice arrangements such as linear, planar, triangular, etc. The technique of the invention can be applied to various antenna types, including but not limited to dielectric resonator antenna, patch antenna, slot antenna, dipole antenna, etc. In some embodiments, the construction of the antenna may be different from those illustrated. For example, the dielectric resonator element, the dielectric slabs, the metal ring/block can be of different shapes, sizes, forms, etc. In some embodiments, the dielectric constant(s), or effective dielectric constant(s), of the dielectric resonator element, the dielectric slabs, etc., can be different from the values illustrated. In some embodiments, the antenna of the invention can be arranged to operate in other frequency range(s)/band(s), not limited to X-band. The extent of the central radiation reduction provided by the radiation pattern shaping mechanism, including the range and value of radiation reduction, may be different for different embodiments, i.e., not limited to those illustrated above.

The invention claimed is:

1. An antenna for a phased array antenna, comprising:

a substrate;

a dielectric radiation element arranged on the substrate;

a radiation pattern shaping mechanism operable to reduce central radiation provided by the radiation element during operation; and wherein the radiation pattern shaping mechanism comprising a ring-shaped element arranged on the substrate and defining an opening that receives a first portion of the dielectric resonator element, such that the first portion is surrounded by the ring-shaped element; the dielectric resonator element having a second portion that extends out of the opening in a direction away from the substrate.

2. The antenna of claim 1, wherein the central radiation is a central radiation in H-plane and/or E-plane of the dielectric radiation element.

3. The antenna of claim 2, wherein the radiation pattern shaping mechanism is further operable to increase a beamwidth of radiation provided by the dielectric radiation element during operation.

4. The antenna of claim 3, wherein the beamwidth is a beamwidth of radiation in the H-plane and/or the E-plane of the dielectric radiation element.

5. The antenna of claim 1, wherein the ring-shaped element and the dielectric resonator element are not in direct contact.

6. The antenna of claim 1, wherein the ring-shaped element is a metallic element.

7. The antenna of claim 1, wherein the ring-shaped element has an annular shape.

8. The antenna of claim 1, wherein a height of the ring-shaped element is less than half of a height of the dielectric resonator element.

9. The antenna of claim 1, wherein the radiation pattern shaping mechanism further comprises a dielectric element arranged on the dielectric resonator element, and the dielectric element is operable to facilitate resonance in the dielectric resonator element during operation.

10. The antenna of claim 9, wherein a dielectric constant or effective dielectric constant of the dielectric element is less than a dielectric constant or effective dielectric constant of the dielectric resonator element such that a quasi-magnetic interface is formed between the dielectric element and the dielectric resonator element.

11. The antenna of claim 10, wherein the dielectric constant or effective dielectric constant of the dielectric element is less than half of the dielectric constant or effective dielectric constant of the dielectric resonator element.

12. The antenna of claim 9, wherein a height of the dielectric element is less than a height of the dielectric resonator element.

13. The antenna of claim 9, wherein the dielectric element and the dielectric resonator element are coaxial and have the same cross sectional shape and/or size.

14. The antenna of claim 13, wherein the dielectric element and the dielectric resonator element form a cylinder with the dielectric resonator element defining a lower cylindrical portion and the dielectric element defining an upper cylindrical portion.

15. The antenna of claim 9, wherein the dielectric element and the dielectric resonator element are integrally formed.

16. The antenna of claim 9, wherein the dielectric element is a first dielectric element; and wherein the radiation pattern shaping mechanism further comprises a second dielectric element arranged on the first dielectric element.

17. The antenna of claim 16, wherein a dielectric constant or effective dielectric constant of the second dielectric element is larger than a dielectric constant or effective dielectric constant of the first dielectric element.

18. The antenna of claim 17, wherein the dielectric constant or effective dielectric constant of the second dielectric element is the same as a dielectric constant or effective dielectric constant of the dielectric resonator element.

19. The antenna of claim 16, wherein a height of the second dielectric element is less than a height of the first dielectric element.

20. The antenna of claim 16, wherein the first dielectric element, the second dielectric element, and the dielectric resonator element are integrally formed.

21. The antenna of claim 16, wherein the first dielectric element, the second dielectric element, and the dielectric resonator element form a cylinder, with the dielectric resonator element defining a lower cylindrical portion, the first dielectric element defining a middle cylindrical portion, and the second dielectric element defining an upper cylindrical portion.

22. The antenna of claim 1, wherein the antenna further comprises: a slot feed mechanism with a feed slot, the feed slot and the dielectric resonator element defining a gap.

23. A phased array antenna comprising at least one of the antenna of claim 1.

24. The phased array antenna of claim 23, wherein the phased array antenna provide a scan range of at least ±50° with a gain fluctuation less than 2 dB in the scan range.

25. The phased array antenna of claim 23, wherein the phased array antenna provide a scan range of at least ±70° with a gain fluctuation less than 2 dB in the scan range.

26. The phased array antenna of claim 23, wherein the phased array antenna provide a scan range of at least ±70° with a gain fluctuation less than 1 dB in the scan range.

27. A phased array antenna comprising:

a substrate;

at least two dielectric radiation elements arranged on the substrate;

at least two radiation pattern shaping mechanisms, each associated with a respective one of the at least two radiation elements, operable to reduce central radiation provided by a corresponding one of the at least two radiation elements during operation; and wherein each of the radiation pattern shaping mechanisms comprises a ring-shaped element arranged on the substrate and defining an opening that receives a first portion of the respective dielectric resonator element, such that the first portion is surrounded by the ring-shaped element;

the dielectric resonator element having a second portion that extends out of the opening in a direction away from the substrate.

* * * * *